(12) United States Patent
Naito

(10) Patent No.: US 10,275,647 B2
(45) Date of Patent: Apr. 30, 2019

(54) METHOD, APPARATUS, AND PROGRAM FOR JUDGING GRID QUALITY

(71) Applicant: FUJIFILM Corporation, Tokyo (JP)

(72) Inventor: Satoshi Naito, Kanagawa-ken (JP)

(73) Assignee: FUJIFILM Corporation, Tokyo (JP)

(*) Notice: Subject to any disclaimer, the term of this patent is extended or adjusted under 35 U.S.C. 154(b) by 123 days.

(21) Appl. No.: 15/350,097

(22) Filed: Nov. 13, 2016

(65) Prior Publication Data
US 2017/0140203 A1 May 18, 2017

(30) Foreign Application Priority Data
Nov. 17, 2015 (JP) .................................. 2015-224672

(51) Int. Cl.
| | |
|---|---|
| G06K 9/00 | (2006.01) |
| G21K 1/00 | (2006.01) |
| G06K 9/03 | (2006.01) |
| G06K 9/46 | (2006.01) |
| G06K 9/52 | (2006.01) |
| G06T 7/00 | (2017.01) |

(52) U.S. Cl.
CPC ....... *G06K 9/0053* (2013.01); *G06K 9/00503* (2013.01); *G06K 9/00543* (2013.01); *G06K 9/036* (2013.01); *G06K 9/4642* (2013.01); *G06K 9/4652* (2013.01); *G06K 9/522* (2013.01); *G06T 7/0002* (2013.01); *G06K 2209/05* (2013.01); *G06T 2207/10116* (2013.01); *G06T 2207/30168* (2013.01)

(58) Field of Classification Search
USPC ........ 382/100, 103, 106–107, 128–134, 155, 382/162, 168, 173, 181, 224, 232, 274, 382/276, 286–291, 305, 312, 286–291, 382/172; 250/584; 378/4, 21, 154
See application file for complete search history.

(56) References Cited

U.S. PATENT DOCUMENTS

| | | | |
|---|---|---|---|
| 6,269,176 B1 | 7/2001 | Barski et al. | |
| 6,501,829 B2* | 12/2002 | Matsumoto | G21K 5/00 378/154 |
| 7,474,774 B2 | 1/2009 | Inoue | |
| 10,172,583 B2 | 1/2019 | Enomoto et al. | |

(Continued)

FOREIGN PATENT DOCUMENTS

| | | |
|---|---|---|
| JP | S61-133848 | 6/1986 |
| JP | 2002-152467 | 5/2002 |

(Continued)

OTHER PUBLICATIONS

"Office Action of Japan Counterpart Application," dated Jan. 8, 2019,with English translation thereof, pp. 1-7.

*Primary Examiner* — Seyed H Azarian
(74) *Attorney, Agent, or Firm* — JCIPRNET

(57) ABSTRACT

An image obtaining section obtains a radiation image that includes a periodic pattern of a grid. A frequency analyzing section performs frequency analysis on the radiation image to obtain a frequency spectrum of the radiation image. A peak determining section determines a peak within the frequency spectrum to be a target of processing. A first judging section measures the width of the peak which is the target of processing, and judges the quality of the grid based on the measured width of the peak.

18 Claims, 20 Drawing Sheets

(56) References Cited

U.S. PATENT DOCUMENTS

| | | | | |
|---|---|---|---|---|
| 2002/0024027 A1* | 2/2002 | Yamada | ............... | G03B 42/08 |
| | | | | 250/584 |
| 2002/0126800 A1* | 9/2002 | Matsumoto | ............ | A61B 6/06 |
| | | | | 378/154 |
| 2014/0023257 A1* | 1/2014 | Imai | .................. | A61B 6/5252 |
| | | | | 382/131 |
| 2014/0023258 A1* | 1/2014 | Imai | ...................... | G06T 5/002 |
| | | | | 382/132 |
| 2014/0219536 A1* | 8/2014 | Takahashi | ............ | G06T 7/0012 |
| | | | | 382/132 |

FOREIGN PATENT DOCUMENTS

| | | |
|---|---|---|
| JP | 2005052553 | 3/2005 |
| JP | 2013176410 | 9/2013 |
| JP | 2015192846 | 11/2015 |

* cited by examiner

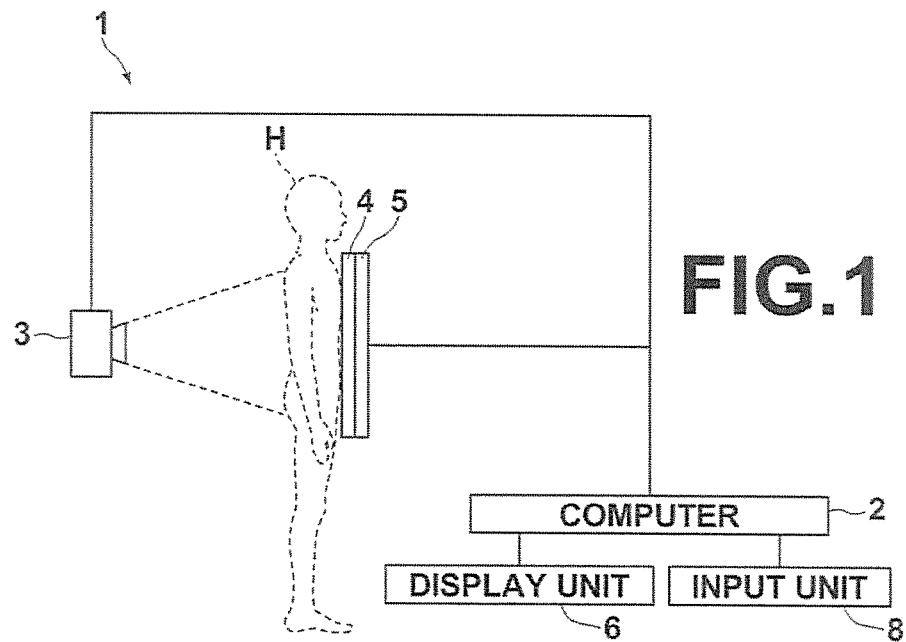
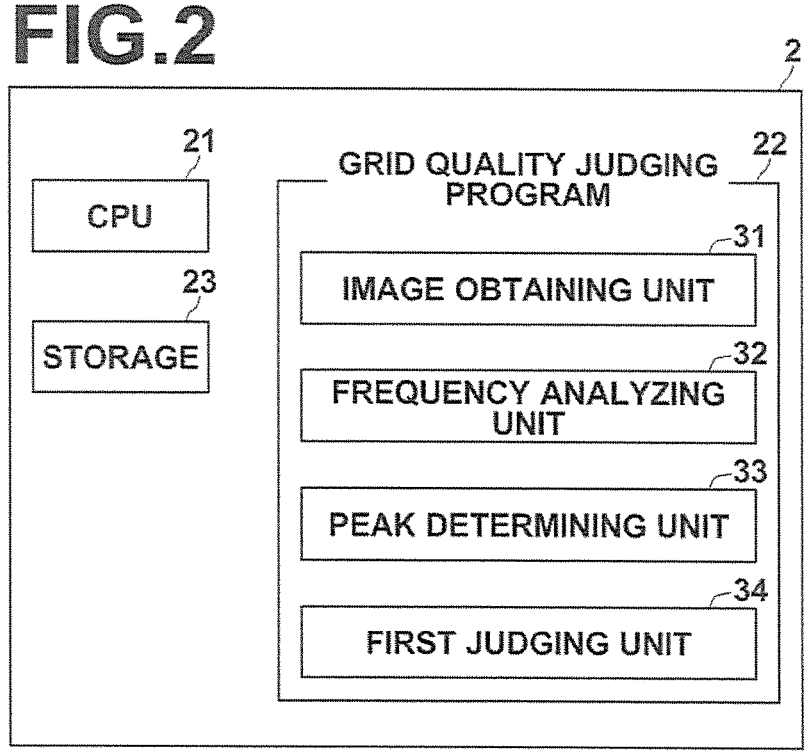

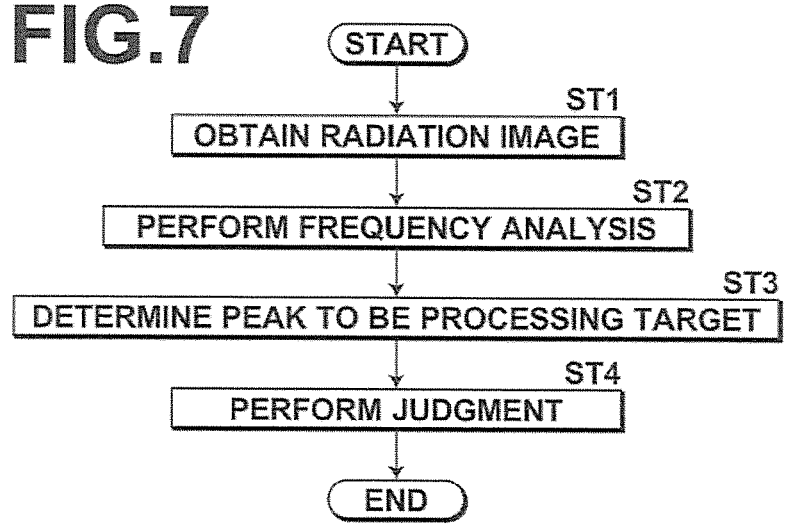
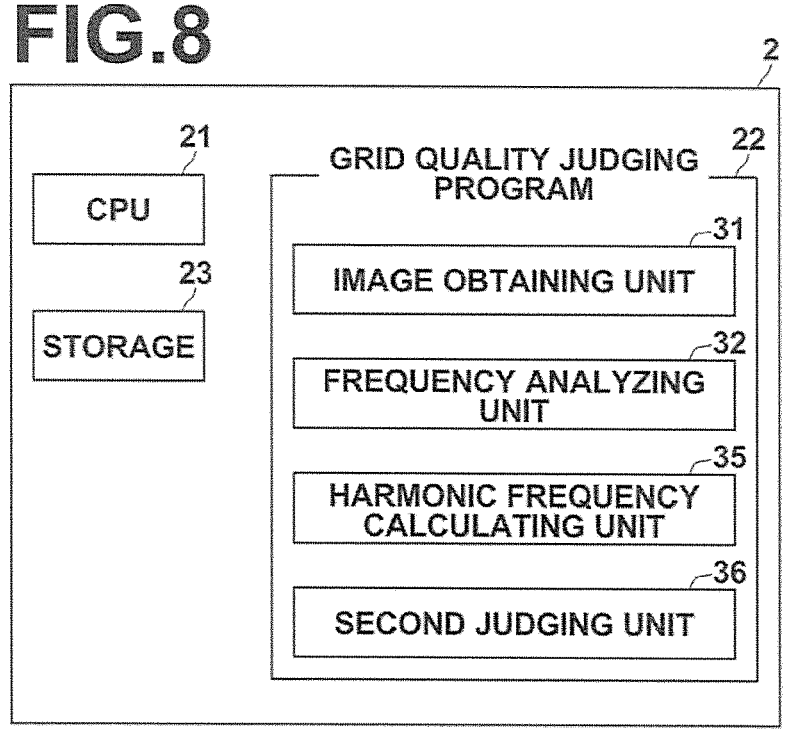

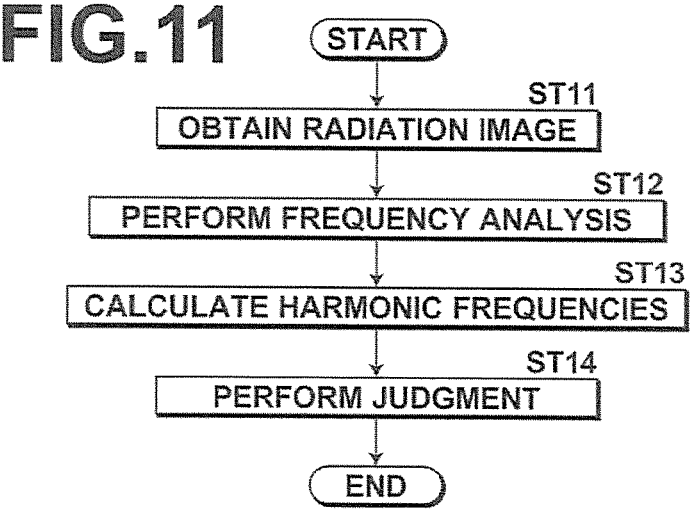
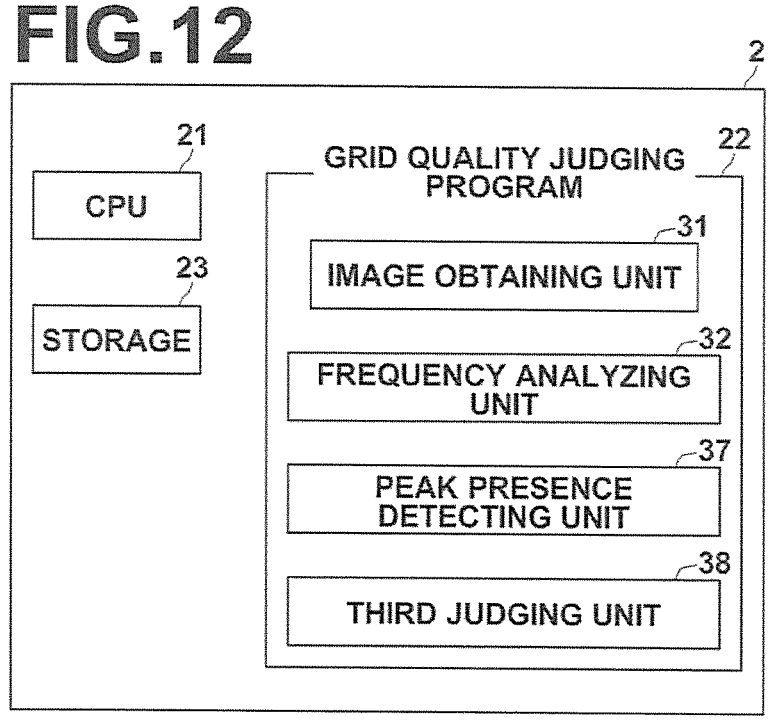

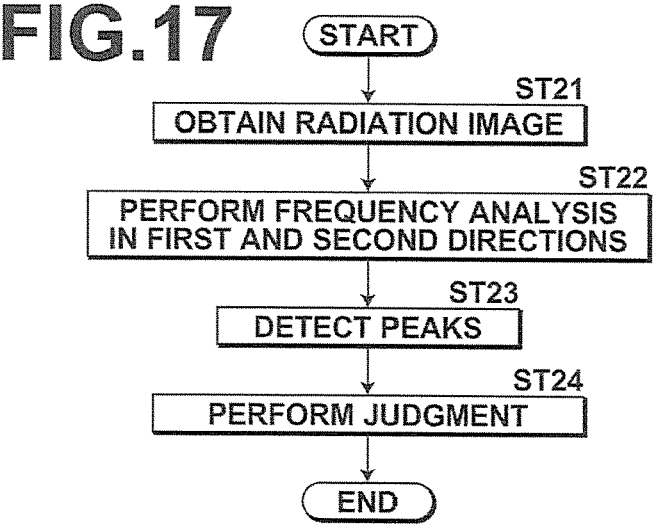
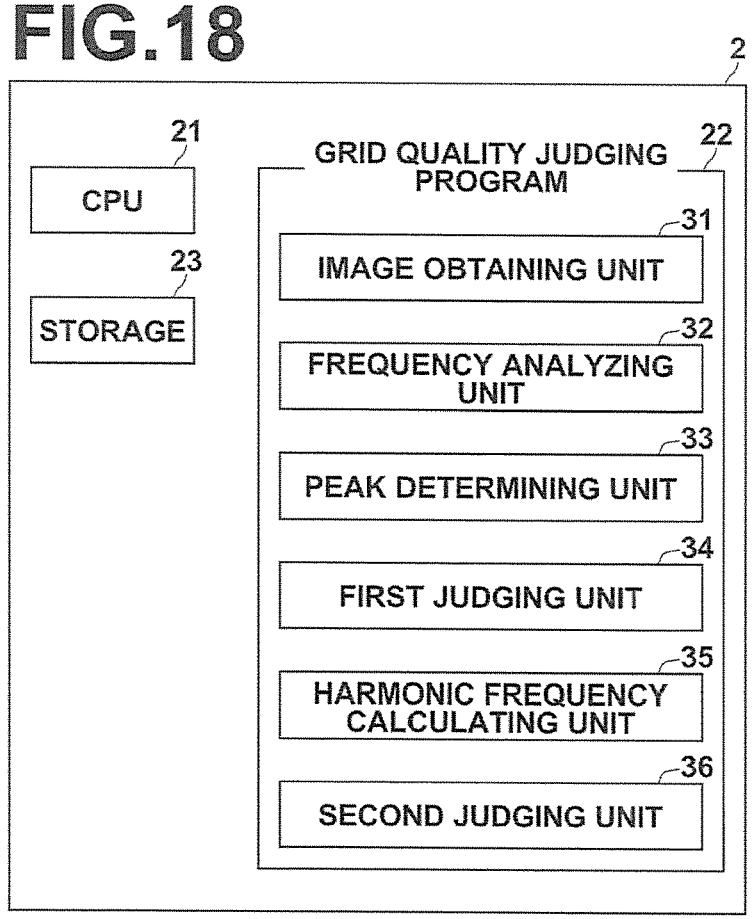

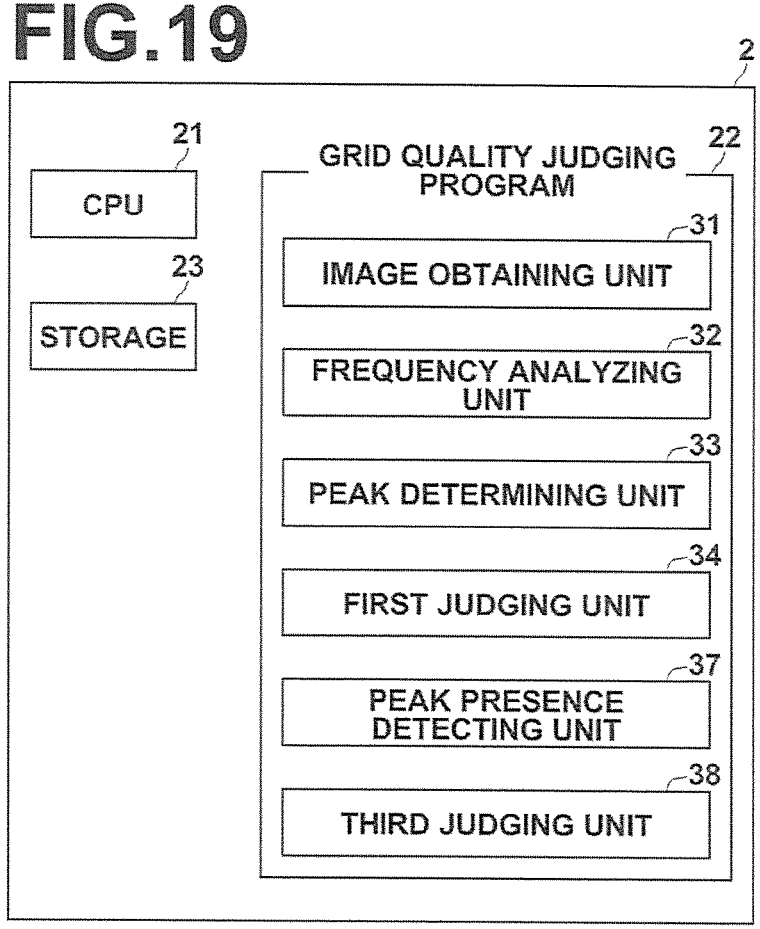

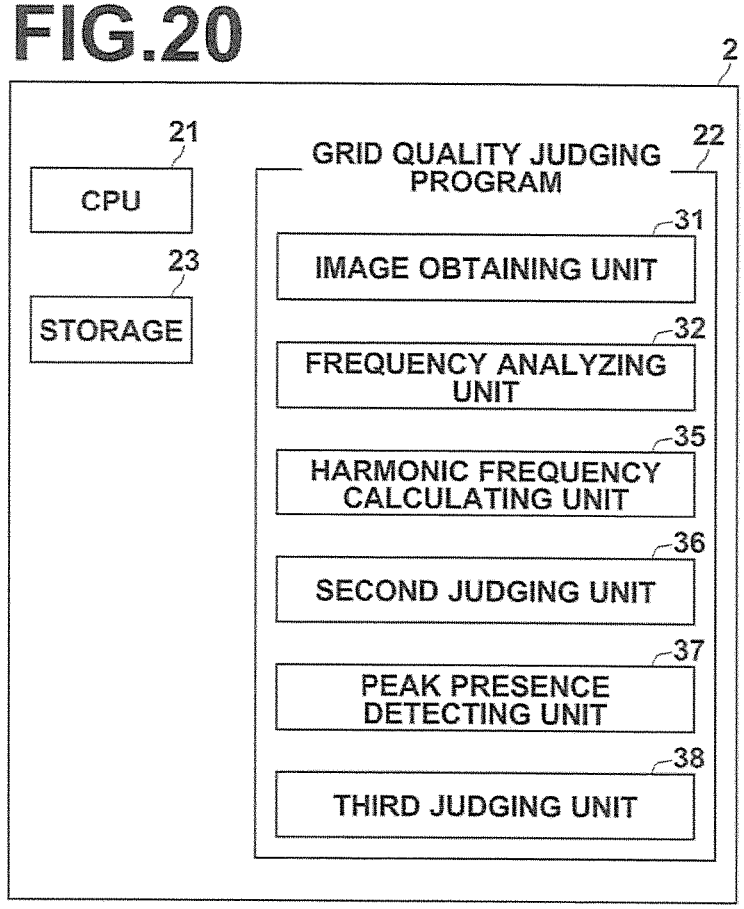

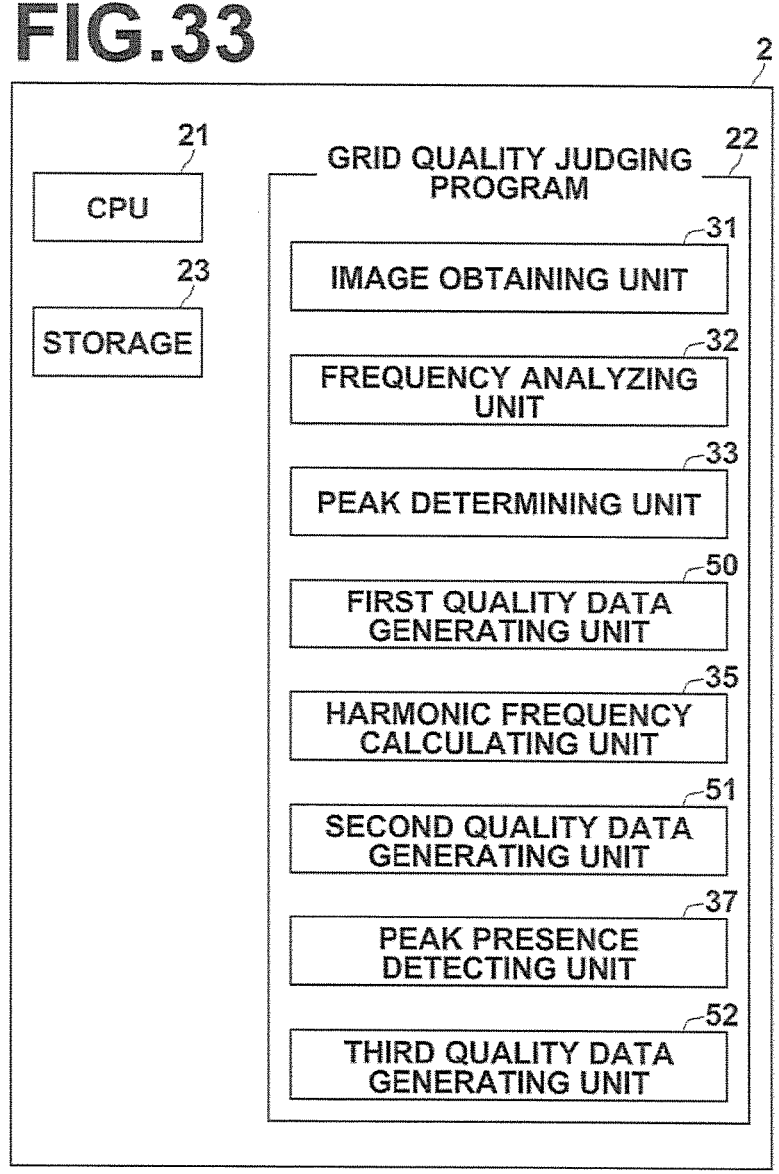

METHOD, APPARATUS, AND PROGRAM FOR JUDGING GRID QUALITY

CROSS REFERENCE TO RELATED APPLICATIONS

The present application claims priority under 35 U.S.C. § 119 to Japanese Patent Application No. 2015-224672 filed on Nov. 17, 2015. The above application is hereby expressly incorporated by reference, in its entirety, into the present application.

BACKGROUND

The present invention is related to a grid quality judging apparatus, a grid quality judging method, and a grid quality judging program for judging the quality of a scattered ray removing grid or for generating quality data that represents the quality of the scattered ray removing grid, which is utilized in cases that radiation images are obtained, that removes the influence of scattered rays scattered by a subject.

When obtaining a radiation image of a subject formed by radiation which has passed through the subject, scattered rays are generated within the subject, particularly when the thickness of a subject is great. Conventionally, there is a problem that these scattered rays decrease the contrast of the obtained radiation image. For this reason, there are cases in which a scattered ray removing grid (hereinafter, simply referred to as "grid") is provided between the subject and a radiation detector for detecting radiation to obtain a radiation image such that the scattered rays are not irradiated onto the radiation detector when performing imaging. If imaging is performed employing the grid, radiation which is scattered by the subject becomes less likely to be irradiated onto the radiation detector, and thereby the contrast of an obtained radiation image can be improved.

A grid is constituted by alternately arranging lead or the like, which does not transmit radiation, and an interspace material such as aluminum, fiber, etc., which readily transmits radiation, at a fine grid density of approximately 4 lines/mm, for example. For this reason, periodic patterns caused by the grid, such as periodic stripes and moire patterns, are generated within radiation images when the grid is employed to perform imaging, resulting in the radiation images becoming difficult to view. Note that a moire pattern is a fine periodic pattern which is generated in the case that the grid density is greater than the Nyquist frequency of a radiation image.

For this reason, various techniques have been proposed to obtain images, of which observation is facilitated, in which periodic patterns are reduced by administering filtering processes to remove the frequency components of periodic patterns (refer to Japanese Unexamined Patent Publication No. 2002-152467).

There are cases in which there are fluctuations in the grid density of grids, which is the number of stripes per unit length, due to manufacturing error and deterioration over time. For this reason, a technique has been proposed, in which interval defects of grids are detected by performing imaging while varying the orientation of the grids, then detecting the interval defects based on the signal strengths of grid images obtained by the imaging operations (refer to Japanese Unexamined Patent Publication No. S61(1986)-133848).

SUMMARY

In the case that the aforementioned fluctuations in grid density are present, unnecessary periodic structures which differ from the intended periodic structure of the grid will be included within the grid. In addition, there are also cases in which the influence of adhesive agents that adhesively attach the materials that constitute the grid cause unnecessary periodic structures different from the intended periodic structure of the grid to be included, in addition to the fluctuations in grid density. Further, the surface of the grid is polished during production thereof. There are cases in which streaks due to polishing are generated in directions different from the direction of the stripes of the grid, and these streaks cause unnecessary periodic structures to be included as well. The frequencies of such unnecessary periodic structures are different from the frequency of the intended periodic structures of the grid. For this reason, even if filtering processes are administered to remove frequency components of more patterns which are generated due to a grid from a radiation image which is obtained by performing imaging employing the grid, it is not possible to remove frequency components that correspond to the unnecessary periodic structures from the radiation image. Frequency components corresponding to such unnecessary periodic structures that cannot be removed become a hindrance to diagnosis employing the radiation image. Accordingly, it is preferable for a judgment to be rendered regarding whether a grid is of a utilizable quality when performing imaging utilizing a grid, and to utilize only grids having utilizable qualities.

Interval defects of a grid can be detected if the technique disclosed in Japanese Unexamined Patent Publication No. S61(1986)-133848 is employed, and therefore whether a grid is of a utilizable quality can be judged. However, it is necessary to perform a plurality of imaging operations while changing the orientation of a grid and a plurality of analyses of signal strengths in the technique disclosed in Japanese Unexamined Patent Publication No. S61(1986)-133848. Therefore, a long amount of time is required for the process of judging the quality of a grid.

The present disclosure has been developed based on the foregoing circumstances. The present disclosure enables the quality of a grid to be judged easily.

A first grid quality judging apparatus of the present disclosure comprises:

a frequency analyzing means for performing frequency analysis on a radiation image that includes a periodic pattern caused by a grid, to obtain a frequency spectrum of the radiation image; and a judging means for judging the quality of the grid, based on peaks which are included in the frequency spectrum.

Note that in the first grid quality judging apparatus of the present disclosure, the judging means may measure the widths of the peaks and judge the quality of the grid based on the measured widths of the peaks.

In addition, the first grid quality judging apparatus of the present disclosure may further comprise a peak determining means for determining peaks within the frequency spectrum which will be targets of processing, and the judging means may measure the widths of the peaks which are the targets of processing and judge the quality of the grid based on the measured widths of the peaks which are the targets of processing.

In addition, in the first grid quality judging apparatus of the present disclosure, the frequency analyzing means may divide the radiation image into a plurality of regions and obtain frequency spectra for each of the plurality of regions, and the judging means may measure the widths of peaks within each of the plurality of regions, and judge the quality of the grid in each of the plurality of grids based on the measured widths of the peaks within each of the plurality of regions.

In addition, in the first grid quality judging apparatus of the present disclosure, the frequency analyzing means may divide the radiation image into a plurality of regions and obtain frequency spectra for each of the plurality of regions, the peak determining means may determine peaks to be targets of processing within each of the plurality of regions, and the judging means may measure the widths of peaks which are targets of processing within each of the plurality of regions, and judge the quality of the grid in each of the plurality of regions based on the measured widths of the peaks which are targets of processing within each of the plurality of regions.

In the frequency spectrum, the greatest peak will appear at the frequency having the intended periodic structure of the grid. The "peaks which are to be targets of processing" may be determined to be the frequency having the greatest peak within the frequency spectrum, or may be determined by receiving specification of peaks which are to be targets of processing within the frequency spectrum.

In addition, the first grid quality judging apparatus of the present disclosure may further comprise a harmonic frequency calculating means for calculating the frequency of at least one harmonic which is generated based on the grid density and the Nyquist frequency of the radiation image, and the judging means may compare the frequency of the peaks within the frequency spectrum and the frequency of the at least one harmonic, and judge the quality of the grid based on the presence or the absence of a peak at a frequency different from the frequency of the harmonic.

In this case, the frequency analyzing means may divide the radiation image into a plurality of regions and obtain frequency spectra for each of the plurality of regions, the harmonic frequency calculating means may calculate the frequency of at least one harmonic within each of the plurality of regions, and the judging means may compare the frequency of the peaks within the frequency spectrum and the frequency of the at least one harmonic, and judge the quality of the grid based on the presence or the absence of a peak at a frequency different from the frequency of the harmonic within each of the plurality of regions.

In addition, in the first grid quality judging apparatus of the present disclosure, the frequency analyzing means may obtain frequency spectra for each of a first and second direction which are perpendicular to each other, by performing frequency analysis in the first and second directions within the radiation image, the first grid quality judging apparatus may further comprise a peak presence detecting means for detecting the presence or absence of peaks within the frequency spectra for the first and second directions, and the judging means may judge the quality of the grid based on the presence or absence of peaks within the frequency spectra for the first and second directions.

In this case, the frequency analyzing means may divide the radiation image into a plurality of regions and obtain frequency spectra for the first and second directions within each of the plurality of regions, the peak presence detecting means may detect the presence or absence of peaks within the frequency spectra of each of the plurality of regions, and the judging means may judge the quality of the grid based on the presence or absence of peaks within the frequency spectra for the first and second directions within each of the plurality of regions.

A second grid quality judging apparatus of the present disclosure comprises:

a frequency analyzing means for performing frequency analysis on a radiation image that includes a periodic pattern caused by a grid, to obtain a frequency spectrum of the radiation image;

a quality data generating means that generates quality data that represents the quality of the grid, based on peaks which are included in the frequency spectrum; and a display means for displaying the quality data.

The "quality data" refers to data that enables those who view the displayed quality data to judge the quality of the grid. Specific examples of the quality data include: the widths of peaks which are targets of processing within the frequency spectrum to be described later; the presence or absence of peaks at frequencies different from that of a harmonic frequency; and the presence or absence of peaks within frequency spectra for a first and second direction which are perpendicular to each other within the radiation image.

Note that in the second grid quality judging apparatus of the present disclosure, the quality data generating means may measure the widths of the peaks and generate the quality data based on the measured widths of the peaks.

In addition, the second grid quality judging apparatus of the present disclosure may further comprise a peak determining means for determining peaks within the frequency spectrum which will be targets of processing, and the quality data generating means may measure the widths of the peaks which are the targets of processing and generate the quality data based on the measured widths of the peaks which are the targets of processing.

In addition, in the second grid quality judging apparatus of the present disclosure, the frequency analyzing means may divide the radiation image into a plurality of regions and obtain frequency spectra for each of the plurality of regions, and the quality data generating means may measure the widths of peaks within each of the plurality of regions, and generate the quality data for each of the plurality of grids based on the measured widths of the peaks within each of the plurality of regions.

In addition, in the second grid quality judging apparatus of the present disclosure, the frequency analyzing means may divide the radiation image into a plurality of regions and obtain frequency spectra for each of the plurality of regions, the peak determining means may determine peaks to be targets of processing within each of the plurality of regions, and the quality data generating means may measure the widths of peaks which are targets of processing within each of the plurality of regions, and generate the quality data for each of the plurality of regions based on the measured widths of the peaks which are targets of processing within each of the plurality of regions.

In addition, the second grid quality judging apparatus of the present disclosure may further comprise a harmonic frequency calculating means for calculating the frequency of at least one harmonic which is generated based on the grid density and the Nyquist frequency of the radiation image, and the quality data generating means may compare the frequency of the peaks within the frequency spectrum and the frequency of the at least one harmonic, and generate the quality data based on the presence or the absence of a peak at a frequency different from the frequency of the harmonic.

In this case, the frequency analyzing means may divide the radiation image into a plurality of regions and obtain frequency spectra for each of the plurality of regions, the harmonic frequency calculating means may calculate the frequency of at least one harmonic within each of the plurality of regions, and the quality data generating means may compare the frequency of the peaks within the frequency spectrum and the frequency of the at least one harmonic, and generate the quality data based on the presence or the absence of a peak at a frequency different from the frequency of the harmonic within each of the plurality of regions.

In addition, in the second grid quality judging apparatus of the present disclosure, the frequency analyzing means may obtain frequency spectra for each of a first and second direction which are perpendicular to each other, by performing frequency analysis in the first and second directions within the radiation image, the second grid quality judging apparatus may further comprise a peak presence detecting means for detecting the presence or absence of peaks within the frequency spectra for the first and second directions, and the quality data generating means may generate the quality data based on the presence or absence of peaks within the frequency spectra for the first and second directions.

In this case, the frequency analyzing means may divide the radiation image into a plurality of regions and obtain frequency spectra for the first and second directions within each of the plurality of regions, the peak presence detecting means may detect the presence or absence of peaks within the frequency spectra of each of the plurality of regions, and the quality data generating means may generate the quality data based on the presence or absence of peaks within the frequency spectra for the first and second directions within each of the plurality of regions.

A first grid quality judging method of the present disclosure comprises:

performing frequency analysis on a radiation image that includes a periodic pattern caused by a grid, to obtain a frequency spectrum of the radiation image; and judging the quality of the grid, based on peaks which are included in the frequency spectrum.

A second grid quality judging method of the present disclosure comprises:

performing frequency analysis on a radiation image that includes a periodic pattern caused by a grid, to obtain a frequency spectrum of the radiation image;

generating quality data that represents the quality of the grid, based on peaks which are included in the frequency spectrum; and displaying the quality data.

The first and second grid quality judging methods of the present disclosure may be provided as programs to be executed by a computer.

According to the first grid quality judging apparatus, the first grid quality judging method, and the first grid quality judging program of the present disclosure, frequency analysis is performed on a radiation image that includes a periodic pattern caused by a grid, to obtain a frequency spectrum of the radiation image. Then, the quality of the grid is judged, based on peaks which are included in the frequency spectrum. Here, the manner in which the peaks which are included in the frequency spectrum appear will differ depending on the presence or absence of unnecessary periodic structures which are different from the intended periodic structure of the grid. The first grid quality judging apparatus, the first grid quality judging method, and the first grid quality judging program of the present disclosure are capable of judging the presence or absence of periodic structures which are unnecessary in the grid, based on the peaks which are included within the frequency spectrum. Accordingly, the quality of the grid can be judged easily, only by performing imaging employing the grid.

According to the second grid quality judging apparatus, the second grid quality judging method, and the second grid quality judging program of the present disclosure, frequency analysis is performed on a radiation image that includes a periodic pattern caused by a grid, to obtain a frequency spectrum of the radiation image. Then, quality data that represents quality of the grid is generated, based on peaks which are included in the frequency spectrum, and the quality data is displayed. Here, the manner in which the peaks which are included in the frequency spectrum appear will differ depending on the presence or absence of unnecessary periodic structures which are different from the intended periodic structure of the grid. The second grid quality judging apparatus, the second grid quality judging method, and the second grid quality judging program of the present disclosure enable the presence or absence of periodic structures which are unnecessary in the grid to be judged, based on the peaks which are included within the frequency spectrum. Accordingly, the quality of the grid can be judged easily, only by performing imaging employing the grid.

BRIEF DESCRIPTION OF THE DRAWINGS

FIG. 1 is a block diagram that schematically illustrates the configuration of a radiation imaging system to which a grid quality judging apparatus according to a first embodiment of the present disclosure is applied.

FIG. 2 is a diagram that illustrates the schematic structure of the grid quality judging apparatus according to the first embodiment.

FIG. 7 is a flow chart that illustrates the processes which are performed by the first embodiment.

FIG. 8 is a diagram that illustrates the schematic structure of a grid quality judging apparatus according to a second embodiment.

FIG. 11 is a flow chart that illustrates the processes which are performed by the second embodiment.

FIG. 12 is a diagram that illustrates the schematic structure of a grid quality judging apparatus according to a third embodiment.

FIG. 17 is a flow chart that illustrates the processes which are performed by the third embodiment.

FIG. 18 is a diagram that illustrates the schematic structure of a grid quality judging apparatus according to a fourth embodiment.

FIG. 19 is a diagram that illustrates the schematic structure of a grid quality judging apparatus according to a fifth embodiment.

FIG. 20 is a diagram that illustrates the schematic structure of a grid quality judging apparatus according to a sixth embodiment.

FIG. 33 is a diagram that illustrates the schematic structure of a grid quality judging apparatus according to a fourteenth embodiment.

DETAILED DESCRIPTION OF THE PREFERRED EMBODIMENTS

Figure 3:
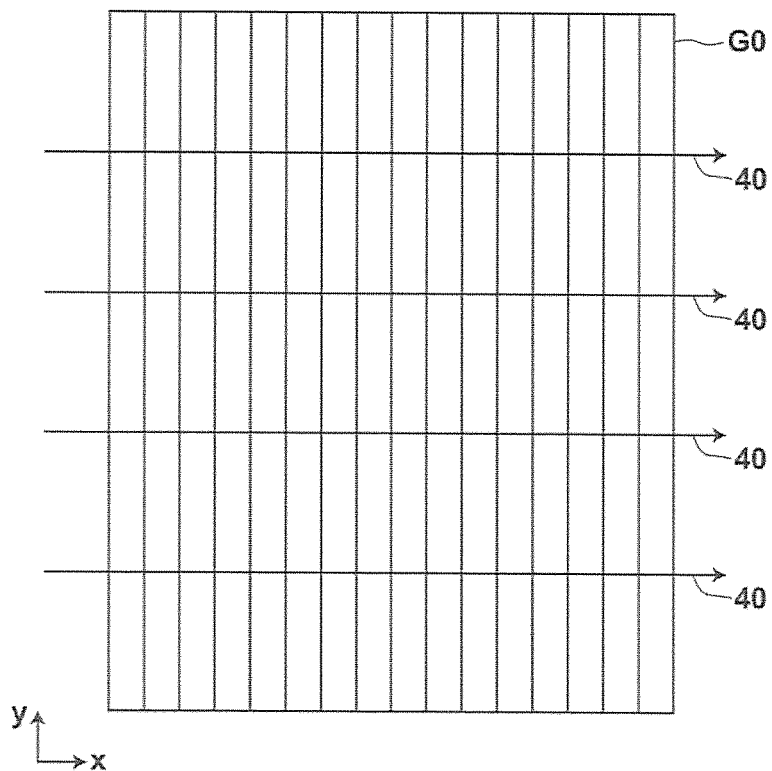
FIG. 3 is a diagram for explaining frequency analysis which is performed by the first embodiment.

Hereinafter, embodiments of the present disclosure will be described with reference to the attached drawings. FIG. 1 is a block diagram that schematically illustrates the configuration of a radiation imaging system to which a grid quality judging apparatus according to a first embodiment of the present disclosure is applied. As illustrated in FIG. 1, the radiation imaging system of the present embodiment images a radiation image of a grid and performs a process of judging the quality of the grid employing the radiation image, and is constituted by: an imaging apparatus 1, and a computer 2 having the grid quality judging apparatus according to the present embodiment installed therein.

The imaging apparatus 1 is equipped with: an X ray source 3 that irradiates X rays as radiation onto a subject H illustrated by broken lines during imaging of the subject H; and a radiation detector 5 that detects the X rays which have passed through the subject H and obtains a radiation image G0 of the subject H. In addition, during imaging of the subject H, a scattered ray removing grid 4 (hereinafter, simply referred to as "grid 4") for removing scattered rays which are scattered by the subject H is provided between the subject H and the radiation detector 5.

The grid 4 is constituted by alternately arranging lead or the like, which does not transmit radiation, and an interspace material such as aluminum, fiber, etc., which readily transmits radiation, at a fine grid density of approximately 4 lines/mm, for example.

The radiation detector 5 is capable of repeatedly recording and reading out radiation images. A direct type radiation detector that directly receives irradiation of radiation and generates electrical charges may be employed, or an indirect type radiation detector that temporarily converts radiation to visible light and converts the visible light to electrical signals may be employed. In addition, it is desirable for the readout method to be the TFT readout method, which reads out radiation image signals by turning TFT's (Thin Film Transistors) ON and OFF, or the optical readout method, which reads out radiation images by irradiating readout light. However, the readout method is not limited to these methods, and other methods may be employed.

Note that in the present embodiment, a radiation image G0 which is obtained by imaging the subject H may be employed to judge the quality of the grid. However, the X ray source 3 is driven, radiation which has passed through the grid 4 is detected by the radiation detector 5, and a radiation image G0 of the grid 4 is obtained without positioning the subject H, in order to judge the quality of the grid more accurately.

A display unit 6 and an input unit 8 are connected to the computer 2. The display unit 6 is constituted by a CRT (Cathode Ray Tube), a liquid crystal display, or the like, and assists in various types of input which are necessary for processing radiation images obtained by imaging and for processes to be performed by the computer 2. The input unit 8 is constituted by a keyboard, a mouse, a touch panel, or the like.

A grid quality judging program of the present embodiment is installed in the computer 2. In the present embodiment, the computer may be a work station or a personal computer which is directly operated by an operator, or may be a server computer connected to the work station or the personal computer via a network. The grid quality judging program is recorded on recording media such as a DVD (Digital Versatile Disc) and a CD-ROM (Compact Dick Read Only Memory) which are distributed, and installed onto the computer from the recording medium. Alternatively, the grid quality judging program is stored in a recording device of a server computer connected to a network or in a network storage, in a state accessible from the exterior, downloaded to the computer according to a request, then installed therein.

FIG. 2 is a diagram that illustrates the schematic structure of the grid quality judging apparatus according to the first embodiment, which is realized by installing the grid quality judging program in the computer 2. As illustrated in FIG. 2, the grid quality judging apparatus is equipped with a CPU (Central Processing Unit) 21, a memory 22, and a storage 23, as components of a standard computer.

The storage 23 is constituted by a hard disk or a solid state drive (SSD), and has various types of data stored therein, including programs for driving each component of the imaging apparatus 1 and the grid quality judging program. In addition, radiation images which are obtained by imaging are also stored in the storage 23.

The programs and the like which are stored in the storage 23 are temporarily stored in the memory 22 in order for various processes to be executed by the CPU 21. The grid quality judging program defines an image obtaining process that causes the imaging apparatus 1 to perform imaging to obtain a radiation image G0 of the grid 4, a frequency analyzing process that performs frequency analysis on the radiation image G0 to obtain a frequency spectrum of the radiation image G0, a peak determining process that determines peaks which are to be target of processing within the frequency spectrum, and a judging process that judges the quality of the grid based on the peaks which are included in the frequency spectrum, as processes to be executed by the CPU 21.

The computer 2 functions as an image obtaining unit 31, a frequency analyzing unit 32, a peak determining unit 33, and a first judging unit 34, by the CPU 21 executing these processes according to the grid quality judging program. Note that the computer 2 may be equipped with processors that respectively perform the image obtaining process, the frequency analyzing process, the peak determining process, and the judging process.

The imaging obtaining unit 31 obtains the radiation image G0 by imaging the grid 4. That is, the image obtaining unit 31 drives the X ray source 3 to irradiate X rays onto the grid 4, the radiation detector 5 detects X ray which have passed through the grid 4, and obtains the radiation image G0. Note that a program separate from the grid quality judging program may obtain the radiation image G0 and store the radiation image G0 in the storage 23. In this case, the image obtaining unit 31 reads out the radiation image G0 which is stored in the storage 23, for image processing.

The frequency analyzing unit 32 performs frequency analysis on the radiation image G0 by Fourier transform or high speed Fourier transform, to obtain the frequency spectrum of the radiation image G0. FIG. 3 is a diagram for explaining the frequency analyzing process which is performed in the first embodiment. As illustrated in FIG. 3, in the case that the stripes of the grid 4 are parallel to the long side of the radiation detector 5 during imaging, a periodic pattern which is arranged at equidistant intervals in the direction parallel to the long side, that is, the x direction in FIG. 3, is included in the radiation image G0. The frequency analyzing unit 32 performs frequency analysis in a direction perpendicular to the periodic pattern to obtain the frequency spectrum. At this time, frequency spectra are calculated for a plurality of linear regions as indicated by the arrows 40 in FIG. 3, the plurality of frequency spectra obtained in each of these regions are averaged, and ultimately obtained as the frequency spectrum. Note that in the case that the subject H is included in the radiation image G0, it is preferable for the frequency analysis to be performed while avoiding the region in which the subject H is present.

Figure 4:
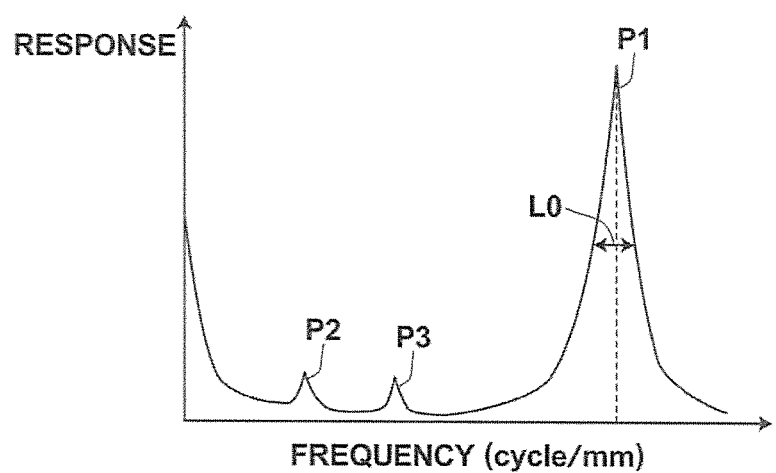
FIG. 4 is a diagram that illustrates a frequency spectrum.

FIG. 4 is a diagram that illustrates the frequency spectrum. Note that in the frequency response of FIG. 4, the horizontal axis represents frequency (cycles/mm) and the vertical axis represents the intensity of response. As illustrated in FIG. 4, the frequency spectrum has peaks at frequencies corresponding to the intended periodic structure of the grid. Specifically, three peaks P1, P2, and P3 are present at a first harmonic, which has the greatest peak in response, a second harmonic, and a third harmonic. The frequencies of the second harmonic and the third harmonic are generally higher than the frequency of the first harmonic. However, in the case that the frequencies of the second harmonic and the third harmonic are greater than the Nyquist frequency, the frequencies are folded back and become lower than the frequency of the first harmonic. In FIG. 4, the frequencies of both the second harmonic and the third harmonic are lower than that of the first harmonic due to this fold back phenomenon.

The peak determining unit 33 determines the peak which will be the target of the process for judging the quality of the grid from within the frequency response obtained by the frequency analyzing unit 32. Specifically, the peak determining unit 33 determines the peak having the greatest response as the peak which is the target of processing. Note that the peak having the greatest response within the frequency response appears at the frequency of the first harmonic. For this reason, input of the frequency of the first harmonic may be received from the input unit 8, and the peak at the input frequency of the first harmonic may be determined to be the target of processing.

Here, the grid density of the grid 4 is known. In addition, the sampling interval of the radiation image G0 is known, and accordingly, the Nyquist frequency of the radiation image G0 is also known. In the case that the grid density is less than or equal to the Nyquist frequency, the frequency of the first harmonic is equal to the grid density. For this reason, the grid density may be input as the frequency of the first harmonic in this case. Meanwhile, in the case that the grid density is greater than the Nyquist frequency, responses at the higher frequency side are folded back to the lower frequency side. Therefore, the frequency of the first harmonic is calculated by Formula (1) below, and the calculated frequency of the first harmonic may be input. Note that F1 is the frequency of the first harmonic, Fn is the Nyquist frequency, N is the grid density, and a is an arbitrary integer that includes 0. Note that the grid density and the Nyquist frequency of the radiation image G0 may be stored in the storage 23, the peak determining unit 33 may read out the grid density and the Nyquist frequency of the radiation image G0, perform calculation employing Formula (1) to calculate the frequency of the first harmonic, and the peak to be the target of processing may be determined from the calculated frequency of the first harmonic.

$$F1 = N - 2*a*Fn \text{ (in the case that } (2*a+1)*Fn > N > 2*a*Fn)$$

$$F1 = 2*(a+1)*Fn - N \text{ (in the case that } 2*(a+1)*Fn > N > (2*a+1)*F) \quad (1)$$

Figure 5:
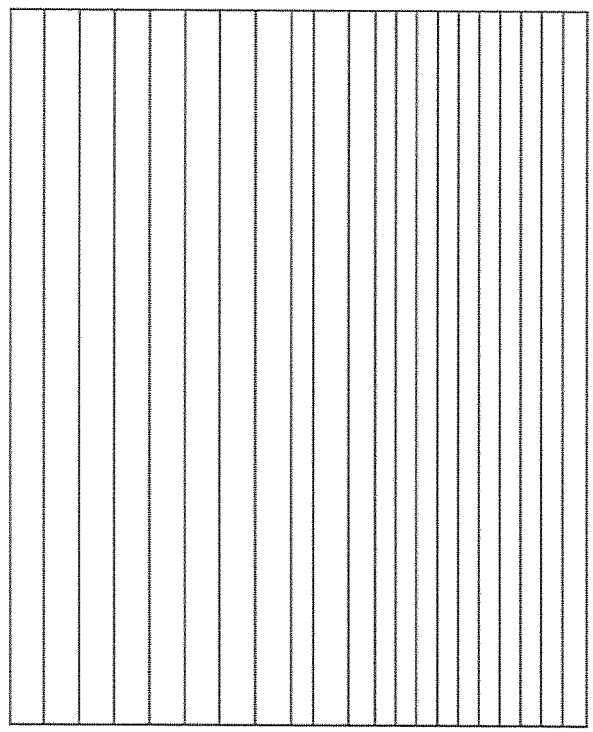
FIG. 5 is a diagram that illustrates a grid having fluctuations in the grid density thereof.

The first judging unit 34 measures the width of the peak which is determined to be the target of processing, and judges the quality of the grid 4 based on the measured width of the peak which is the target of processing. Here, if there are no fluctuations in the grid density, a peak will only appear at a frequency that corresponds to the intended periodic structure of the grid, and therefore the width of the peak which is the target of processing will be small. On the other hand, in the case that there are fluctuations in the grid density at certain positions in the grid 4 as in the grid illustrated in FIG. 5, peaks will appear at frequencies different from the frequency of the intended periodic structure of the grid, in addition to the peak at the frequency of the intended periodic structure of the grid. In addition, these two frequencies will not differ greatly, and the values thereof will be comparatively close. As a result, the peaks of the two frequencies will overlap, and the width of the peak which is the target of processing within the frequency response will become great.

Figure 6:
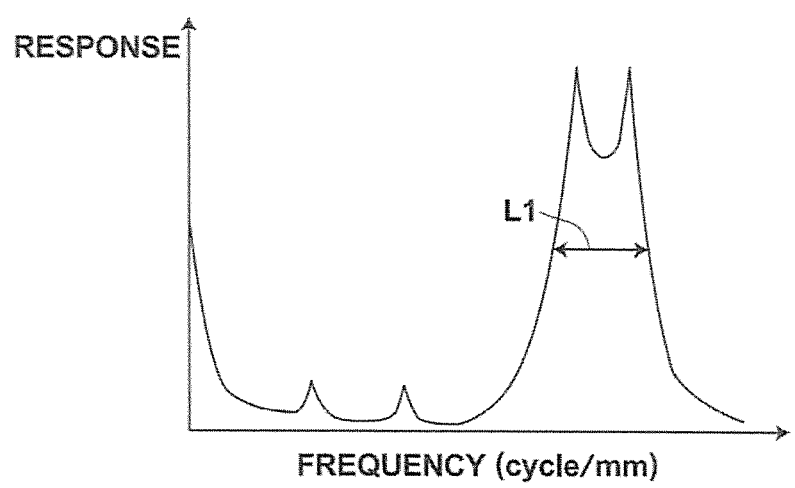
FIG. 6 is a diagram that illustrates a frequency spectrum for a case in which fluctuations in grid density are present.

That is, in the case that there are no fluctuations in grid density, the width of the peak having the greatest response, which is the target of processing, will be L0, as illustrated in FIG. 4. Note that in the present embodiment, a half value at full width is obtained as the width of the peak. Alternatively a half value at half width may be obtained as the width of the peak. On the other hand, in the case that there are fluctuations in the grid density, a peak will also appear at a frequency close to the frequency of the peak that corresponds to the intended periodic structure of the grid, as illustrated in FIG. 6. For this reason, the two peaks will overlap, and the width L1 of the overlapped peaks will be greater than the width L0 illustrated in FIG. 4. Note that in the case that peaks overlap as illustrated in FIG. 6, the half value at full width of one of the peaks may be obtained, or the half value at full width of the response at an average positon of the frequencies of the two peaks may be obtained. In FIG. 6, the half value at full width of the response at an average positon of the frequencies of the two peaks is obtained as the width L1 of the peak which is the target of processing.

As described above, the width of the peak which is the target of processing corresponds to the size of the fluctuations in grid density. That is, the fluctuations in grid density will become smaller as the width of the peak is smaller. For this reason, the first judging unit 34 measures the width of the peak which is the target of processing within the frequency response, and judges the quality of the grid based on the measured width of the peak. Specifically, the first judging unit 34 compares the width of the peak which is the target of processing with a threshold value Th1, and judges the quality of the grid to be poor if the width of the peak which is the target of processing is greater than or equal to the threshold value Th1. On the other hand, the judging unit 34 judges the quality of the grid to be good if the width of the peak which is the target of processing is less than the threshold value Th1. The judging unit 34 outputs the judgment results to the display unit 6. Note that the judgment results may be any display that notifies the quality of the grid to an operator. For example, text reading NG (No Good) in the case that the quality of the grid is poor and OK in the case that the quality of the grid is good, or display of colors according to the quality of the grid may be employed.

Next, the processes which are performed by the first embodiment will be described. FIG. 7 is a flow chart that illustrates the processes which are performed in the first embodiment. First, imaging of the grid 4 is performed and the image obtaining nit 31 of the computer 2 obtains a radiation image G0 (step ST1). Then, the frequency analyzing unit 32 performs frequency analysis on the radiation image G0 and obtains the frequency spectrum of the radiation image G0 (step ST2). Next, the peak determining unit 33 determines the peak which will be a target of processing within the frequency spectrum (step ST3). Then, the first judging unit 34 measures the width of the peak which is the target of processing, judges the quality of the grid 4 (step ST4), and the process ends. The judgment results are displayed by the display unit 6.

As described above, the first embodiment measures the width of the peak which is determined to be the target of processing within the frequency spectrum, and judges the quality of the grid based on the measured width of the peak. Therefore, the quality of the grid related to fluctuations in grid density can be easily judged.

Note that in the first embodiment, frequency spectra are calculated for a plurality of regions as illustrated in FIG. 3, and the calculated frequency spectra are averaged to obtain the ultimate frequency spectrum. However, the frequency spectrum which is calculated for each of the plurality of regions may be employed to determine the peak which is the target of processing within each of the plurality of regions, and the quality of the grid may be judged for each of the plurality of regions. By adopting such a configuration, the quality of the grid related to fluctuations in grid density can be judged for each of the plurality of regions.

In addition, in the first embodiment described above, the peak determining unit 33 determines the peak which is to be the target of processing. However, in the case that only one peak appears in the frequency response, the frequency at which the peak becomes maximal within the frequency response is known, or the like, the first judging unit 34 may measure the width of the peak within the frequency response without determining the peak which is the target of processing, and judge the quality of the grid based on the measured width of the peak. In addition, the first judging unit 34 may measure the widths of peaks within frequency responses and judge the quality of the grid based on the measured widths of the peaks in each of the plurality of regions without determining peaks which are to be targets of processing. In this case, the peak determining unit 33 illustrated in FIG. 2 will become unnecessary.

Next, a second embodiment of the present disclosure will be described. FIG. 8 is a diagram that illustrates the schematic structure of a grid quality judging apparatus according to the second embodiment, which is realized by installing a grid quality judging program into a computer 2. Note that in FIG. 8, constituent elements which are the same as those illustrated in FIG. 2 are denoted with the same reference numerals, and detailed descriptions thereof will be omitted. As illustrated in FIG. 8, the grid quality judging apparatus of the second embodiment differs from the first embodiment in that it is equipped with a harmonic frequency calculating unit 35 that calculates the frequency of at least one harmonic which is generated based on the grid density and the Nyquist frequency of the radiation image G0 and a second judging unit 36 that compares the frequency of a peak within the frequency spectrum and the frequency of the at least one harmonic calculated by the harmonic frequency calculating unit 35 and judges the quality of the grid based on the presence or absence of peaks at frequencies different from the frequency of the harmonic, instead of the peak determining unit 33 and the first judging unit 34.

The harmonic frequency calculating unit 35 calculates the frequency of the at least one harmonic. In the case that there is only one harmonic frequency to be calculated, the frequency of the first harmonic is calculated, and in the case that there are a plurality of harmonic frequencies to be calculated, the frequencies of a first harmonic through an Mth harmonic are calculated. Note that the value of M may be approximately 3, for example. Here, the grid density of the grid 4 is known. In addition, the Nyquist frequency of the radiation image G0 is also known. In the case that the grid density is less than or equal to the Nyquist frequency, the frequency of the first hannonic is equal to the grid density. When calculating the frequency of the Mth harmonic, first, the grid density N is employed to calculate N*M. In the case that the value of N*M is less than or equal to the Nyquist frequency of the radiation image G0, the value of N*M corresponds to the frequency of the Mth harmonic. The harmonic frequency calculating unit 35 calculates the frequency of the Mth harmonic in this manner.

On the other hand, in the case that the grid density is greater than the Nyquist frequency of the radiation image G0, the frequency response toward the high frequency side is folded back to the low frequency side. For this reason, the harmonic frequency calculating unit 35 calculates the frequency of the Mth harmonic by Formula (2) below, employing the grid density and the Nyquist frequency. Note that Fin is the frequency of the Mth harmonic, Fn is the Nyquist frequency, N is the grid density, and a is an arbitrary integer that includes 0. Here, the grid density and the Nyquist density may be obtained by input via the input unit 8. Alternatively, the grid density and the Nyquist frequency of the radiation image G0 may be stored in the storage 23, the harmonic frequency calculating unit 35 may read out the grid density and the Nyquist frequency of the radiation image G0 from the storage 23, and perform calculations employing Formula (2), to calculate the frequency of the Mth harmonic.

$$Fm=N*M-2*a*Fn \text{ (in the case tha}$$
$$(2*a+1)*Fn>N*M>2*a*Fn)$$

$$Fm=2*(a+1)*Fn-N*M \text{ (in the case that } 2*$$
$$(a+1)*Fn>N*M>(2*a+1)*Fn) \qquad (2)$$

Note that Formula (2) calculates the frequency of the Mth harmonic from the grid density N. Alternatively, the frequency F1 of the first harmonic may be employed to calculate the frequency of the Mth harmonic by Formula (3) below, in the case that the frequency F1 of the first harmonic is known.

$$Fm=F1*M-2*a*Fn \text{ (in the case that}$$
$$(2*a+1)*Fn>F1*M>2*a*Fn)$$

$$Fm=2*(a+1)*Fn-F1*M \text{ (in the case that } 2*$$
$$(a+1)*Fn>F1*M>(2*a+1)*Fn) \qquad (3)$$

Figure 9:
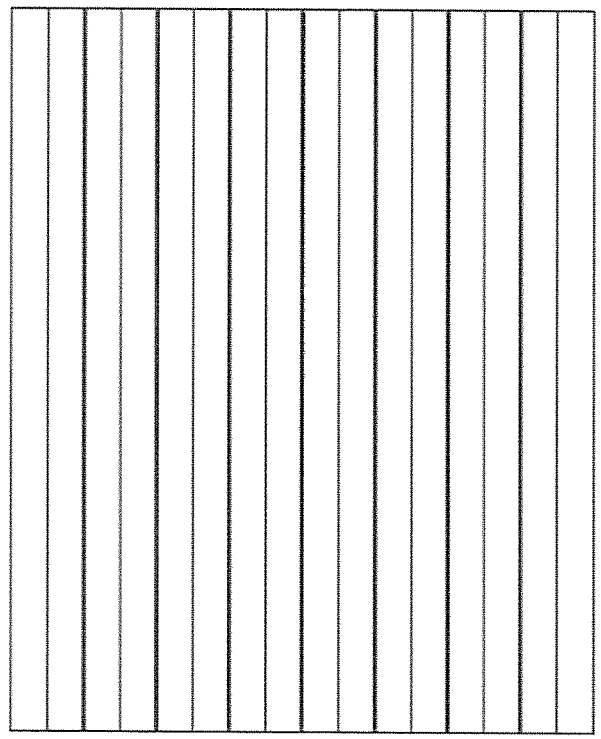
FIG. 9 is a diagram that illustrates a grid in which a periodic structure different from the intended structure of the grid is present.

The second judging unit 36 compares the frequency of the peak within the frequency spectrum and the frequency of the at least one harmonic calculated by the harmonic frequency calculating unit 35, and judges the quality of the grid based on the presence or absence of a peak at a frequency different from the frequency of the harmonic. Here, in the case that a periodic structure different from the intended periodic structure of the grid is not present, the frequency of the peak included in the frequency spectrum will match the calculated frequency of the harmonic. On the other hand, in the case that that a periodic structure different from the intended periodic structure of the grid is present as illustrated in FIG. 9, a peak will appear in the frequency spectrum at a frequency other than the calculated frequency of the harmonic.

Figure 10:
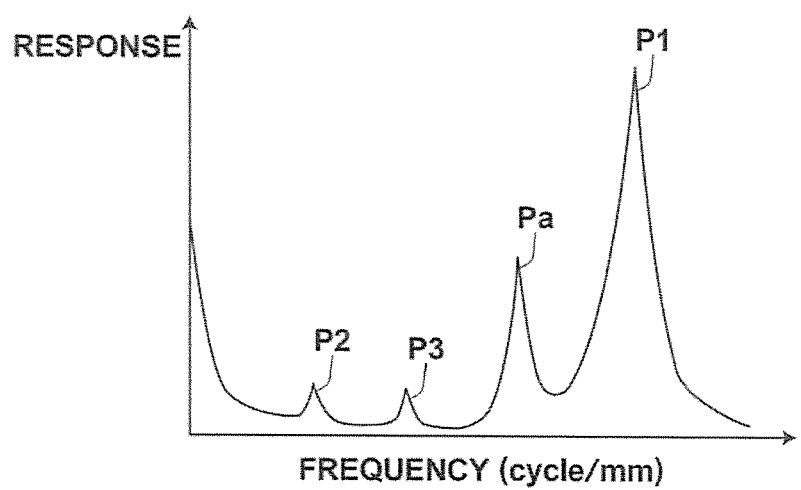
FIG. 10 is a diagram that illustrates a frequency spectrum for a case in which a periodic structure different from the intended structure of a grid is present.

Specifically, in the case that a periodic structure different from the intended periodic structure of the grid is not present in the grid 4, three peaks appear in the frequency response at the first through third harmonics which are generated by the intended periodic structure of the grid, as illustrated in FIG. 4. The frequencies of the three harmonics are the same as the frequencies of first through third harmonics which are calculated by the harmonic frequency calculating unit 35. On the other hand, in the case that a periodic structure different from the intended periodic structure of the grid is present in the grid 4, a peak Pa will appear in the frequency spectrum at a frequency other than the calculated frequencies of the harmonics as illustrated in FIG. 10.

The second judging unit 36 compares the frequencies of the peaks within the frequency spectrum and the frequencies of the M harmonics, and judges the quality of the grid based on the presence or absence of peaks at frequencies other than the frequencies of the M harmonics. Specifically, the second judging unit 36 detects the frequencies of all of the peaks within the frequency response. Then, the second judging unit 36 judges whether a frequency, which is a target from among the frequencies of the detected peaks, is within a predetermined threshold value Th2 with respect to the calculated frequencies of all of the harmonics. Further, this judgment is performed for all of the peaks which are detected within the frequency response. As a result, in the case that a peak is present at a frequency which differs from the calculated frequencies of the harmonics by a value greater than the threshold value Th2, the grid includes an unnecessary periodic structure which is different from the intended structure of the grid, and therefore the quality of the grid is judged to be poor. For example, if a peak Pa appears at a frequency other than the frequencies of the peaks P1 through P3 of the first through third harmonics as illustrated in FIG. 10, the quality of the grid is judged to be poor. The judgment results are displayed by the display unit 6 in the same manner as in the first embodiment.

Next, the processes which are performed by the second embodiment will be described. FIG. 11 is a flow chart that illustrates the processes which are performed by the second embodiment. First, imaging of the grid 4 is performed and the image obtaining unit 31 of the computer 2 obtains a radiation image G0 of the grid (step ST11). Then, the frequency analyzing unit 32 performs frequency analysis on the radiation image G0 and obtains the frequency spectrum of the radiation image G0 (step ST12). Next, the harmonic frequency calculating unit 35 calculates the frequency of at least one harmonic which is generated, based on the grid density and the Nyquist frequency of the radiation image G0 (step ST13). Further, the second judging unit 36 compares the frequencies of peaks within the frequency spectrum and the calculated frequency of the at least one harmonic, judges the quality of the grid 4 based on the presence or absence of peaks at frequencies other than the frequencies of the harmonics (step ST14), and the process ends. The judgment results are displayed by the display unit 6.

As described above, the second embodiment compares the frequencies of the peaks in the frequency spectrum with the calculated frequencies of the at least one harmonic calculated by the harmonic frequency calculating unit 35, and judges the quality of the grid based on the presence or absence of peaks at frequencies different from the frequencies of the harmonics. Therefore, the quality of the grid related to periodic structures different from the intended periodic structure of the grid can be easily judged.

Note that in the second embodiment, frequency spectra are calculated for a plurality of regions as illustrated in FIG. 3, and the calculated frequency spectra are averaged to obtain the ultimate frequency spectrum. However, the frequency spectrum which is calculated for each of the plurality of regions may be employed to judge the quality of the grid for each of the plurality of regions. By adopting such a configuration, the quality of the grid related to periodic structures different from the intended periodic structure of the grid can be judged for each of the plurality of regions.

Next, a third embodiment of the present disclosure will be described. FIG. 12 is a diagram that illustrates the schematic structure of a grid quality judging apparatus according to the third embodiment, which is realized by installing a grid quality judging program into a computer 2. Note that in FIG. 12, constituent elements which are the same as those illustrated in FIG. 2 are denoted with the same reference numerals, and detailed descriptions thereof will be omitted. As illustrated in FIG. 12, the grid quality judging apparatus of the third embodiment differs from the first embodiment in that the frequency analyzing unit 32 performs frequency analysis in a first and a second direction which are perpendicular to each other within the radiation image G0 to obtain a frequency spectrum for each of the first and second directions, and that the grid judging apparatus is equipped with a peak presence detecting unit 37 that detects the presence or absence of peaks in the frequency spectra of the first and second directions and a third judging unit 38 that judges the quality of the grid based on the presence or absence of peaks, instead of the peak determining unit 33 and the first judging unit 34.

Here, when imaging is performed employing the grid 4, the grid 4 is arranged such that the vertical direction or the horizontal direction of the obtained radiation image G0 matches the direction of the strips of the grid 4. The first and second directions which are perpendicular to each other within the radiation image G0 refer to a direction that matches the direction of the stripes of the grid 4 and a direction perpendicular to the direction of the stripes of the grid 4, within the radiation image G0.

Figure 13:
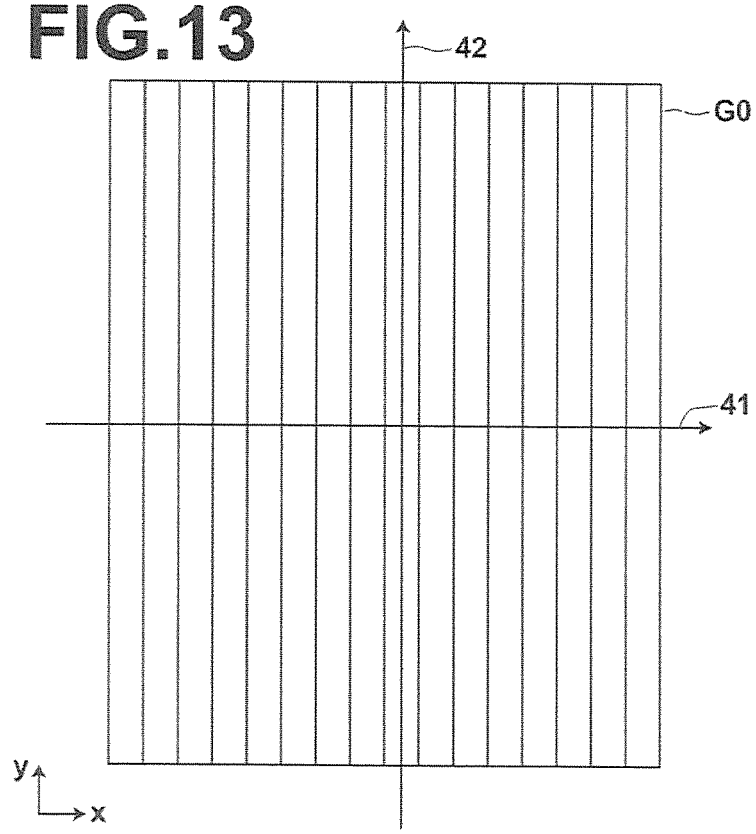
FIG. 13 is a diagram for explaining frequency analysis which is performed by the third embodiment.

FIG. 13 is a diagram for explaining frequency analysis which is performed by the third embodiment. In the case that the stripes of the grid 4 are parallel to the long side of the radiation detector 5 during images as illustrated in FIG. 13, a periodic pattern which is periodically arranged in the direction parallel to the long side, that is, the x direction in FIG. 13, is included in the radiation image G0. In the third embodiment, the frequency analyzing unit 32 performs frequency analysis in the direction perpendicular to and the direction parallel to the stripes of the grid 4, to obtain two frequency spectra. Specifically, the x direction is designated as the first direction and the y direction is designated as the second direction as illustrated in FIG. 13, and frequency analysis is performed on the radiation image G0 in a region in the first direction indicated by the arrow 41 and in a region in the second direction indicated by the arrow 42 by Fourier transform or high speed Fourier transform, to obtain a first and second frequency spectra in the x direction and the y direction of the radiation image G0. At this time, the frequency spectra may be calculated for a plurality of linear regions in the x direction and the y direction, the frequency spectra obtained in these regions may be averaged and obtained as ultimate first and second frequency spectra.

Figure 14:
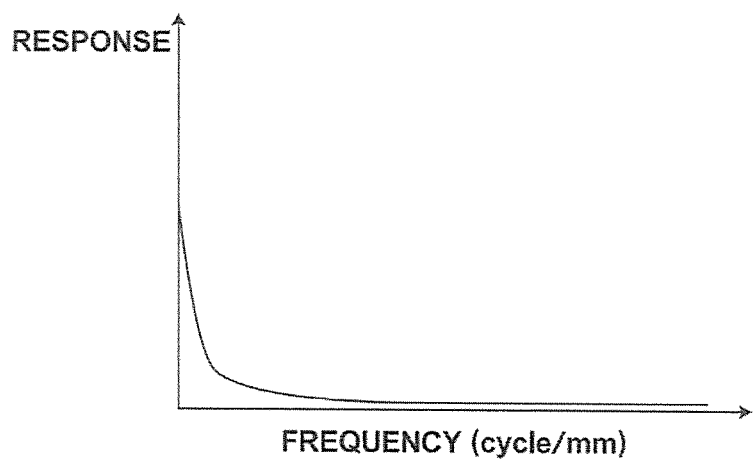
FIG. 14 is a diagram that illustrates a frequency spectrum in the direction of the stripes of a grid.

Here, if periodic structures in a direction different from that of the stripes of the grid are not included in the grid 4 as illustrated in FIG. 3, peaks will be included in only one of the frequency spectra which are obtained for each of the first and second directions, which are perpendicular to each other within the radiation image G0. Specifically, the frequency spectrum which is calculated in the x direction illustrated in FIG. 13 will be that having peaks at frequencies corresponding to the intended periodic structure of the grid, as illustrated in FIG. 3. In addition, no peaks will appear in the frequency spectrum which is calculated in the y direction as illustrated in FIG. 14.

Figure 15:
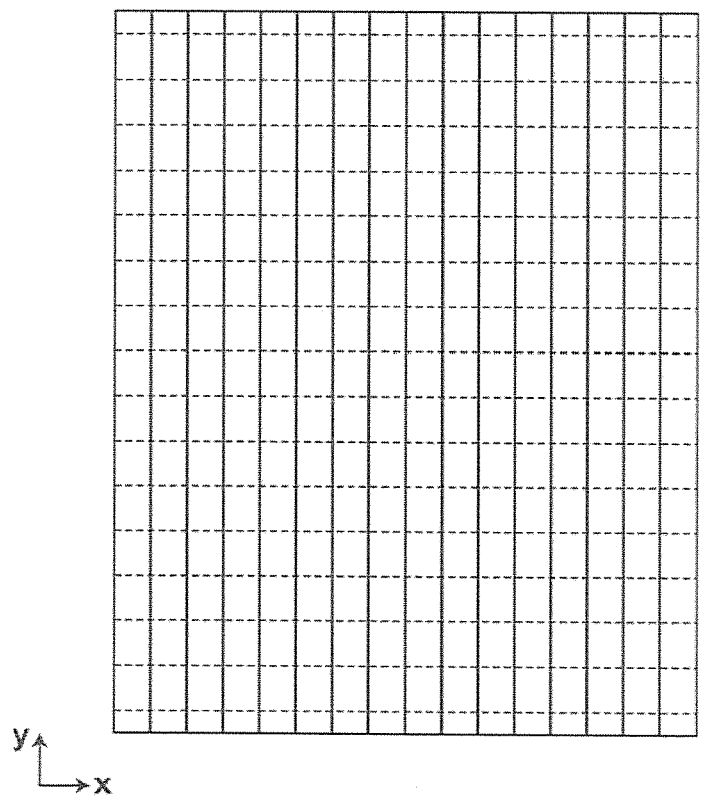
FIG. 15 is a diagram that illustrates a grid that includes a periodic structure in a direction different from that of the strips of a grid.
Figure 16:
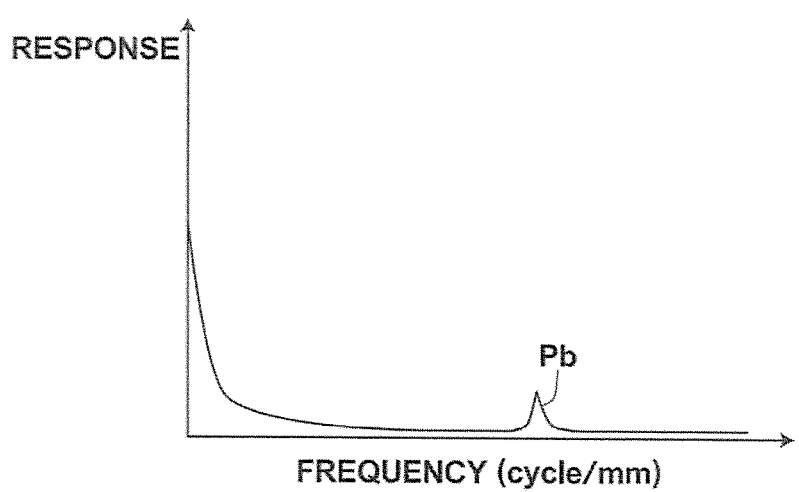
FIG. 16 is a diagram that illustrates a frequency spectrum for a case in which a grid includes a periodic structure in a direction different from that of the strips of the grid.

On the other hand, in the case that a periodic structure in a direction different from the stripes of the grid is included in the grid 4 as illustrated in FIG. 15, a peak Pb will appear in the frequency spectrum which is calculated in the y direction as well, as illustrated in FIG. 16.

At this time, the sizes of the peaks differ in the direction of the stripes of the grid and the direction different therefrom. Therefore, it is possible to recognize which of the first and second directions the directions of the stripes is. For this reason, the peak presence detecting unit 37 detects the presence of peaks in each of the frequency spectra in the first and second directions. The third judging unit 38 judges the quality of the grid based on the presence of peaks in the frequency spectra in the first and second directions. Specifically, the third judging unit 38 judges that the quality of the grid is poor in the case that a peak appears in the frequency spectrum in a direction different from the direction of the stripes of the grid.

Next, the processes which are performed by the third embodiment will be described. FIG. 17 is a flow chart that illustrates the processes which are performed by the third embodiment. First, imaging of the grid 4 is performed and the image obtaining unit 31 of the computer 2 obtains a radiation image G0 of the grid (step ST21). Then, the frequency analyzing unit 32 performs frequency analysis on the radiation image G0 and obtains the frequency spectrum of the radiation image G0 in each of the first and second directions (step ST22). Next, the peak presence detecting unit 37 detects the presence or absence of peaks in the frequency spectra of the first and second directions (step ST23). Thereafter, the third judging unit 38 judges the quality of the grid 4 based on the presence or absence of peaks in the frequency spectrum of each of the first and second directions (step ST24), and the process ends. The judgment results are displayed by the display unit 6.

As described above, the third embodiment judges the quality of the grid based on the presence of peaks in the frequency spectrum of each of the first and second directions. Therefore, the quality of the grid related to periodic structures which are present in a direction different from the direction of the stripes of the grid can be easily judged.

Note that in the third embodiment, the frequency spectra are calculated for the radiation image G0 in the regions of the arrow 41 in the first direction and the arrow 42 in the second direction, to judge the quality of the grid. Alternatively, the radiation image G0 may be divided into a plurality of regions, for example, four equal parts, and the quality of the grid may be judged for each of the plurality of regions based on the presence or absence of peaks in the frequency spectra of the first and second directions within each of the regions. Thereby, the quality of the grid related to periodic structures which are present in a direction different from the direction of the stripes of the grid can be easily judged within each of a plurality of regions.

Next, a fourth embodiment of the present disclosure will be described. FIG. 18 is a diagram that illustrates the schematic structure of a grid quality judging apparatus according to the fourth embodiment, which is realized by installing a grid quality judging program into a computer 2. Note that in FIG. 18, constituent elements which are the same as those illustrated in FIG. 2 are denoted with the same reference numerals, and detailed descriptions thereof will be omitted. As illustrated in FIG. 18, the grid quality judging apparatus of the fourth embodiment differs from the first embodiment in that it is equipped with the harmonic frequency calculating unit 35 and the second judging unit 36 of the second embodiment, in addition to the constituent elements of the grid quality judging apparatus of the first embodiment.

As described above, the fourth embodiment is equipped with the first judging unit 34 of the first embodiment and the second judging unit 36 of the second embodiment. Therefore, both the quality of the grid related to fluctuations in grid density and the quality of the grid related to periodic structures different from the intended periodic structure of the grid can be easily judged.

Next, a fifth embodiment of the present disclosure will be described. FIG. 19 is a diagram that illustrates the schematic structure of a grid quality judging apparatus according to the fifth embodiment, which is realized by installing a grid quality judging program into a computer 2. Note that in FIG. 19, constituent elements which are the same as those illustrated in FIG. 2 are denoted with the same reference numerals, and detailed descriptions thereof will be omitted. As illustrated in FIG. 19, the grid quality judging apparatus of the fifth embodiment differs from the first embodiment in that it is equipped with the peak presence detecting unit 37 and the third judging unit 38 of the third embodiment, in addition to the constituent elements of the grid quality judging apparatus of the first embodiment. Note that in the fifth embodiment, the frequency analyzing unit 32 obtains frequency spectra for each of the first and second directions in the radiation image G0 in the same manner as the third embodiment.

As described above, the fifth embodiment is equipped with the first judging unit 34 of the first embodiment and the third judging unit 38 of the second embodiment. Therefore, both the quality of the grid related to fluctuations in grid density and the quality of the grid related to periodic structures which are present in a direction different from the direction of the stripes of the grid can be easily judged.

Next, a sixth embodiment of the present disclosure will be described. FIG. 20 is a diagram that illustrates the schematic structure of a grid quality judging apparatus according to the sixth embodiment, which is realized by installing a grid quality judging program into a computer 2. Note that in FIG. 20, constituent elements which are the same as those illustrated in FIG. 2 are denoted with the same reference numerals, and detailed descriptions thereof will be omitted. As illustrated in FIG. 20, the grid quality judging apparatus of the sixth embodiment differs from the first embodiment in that it is equipped with the peak presence detecting unit 37 and the third judging unit 38 of the third embodiment, in addition to the constituent elements of the grid quality judging apparatus of the second embodiment. Note that in the sixth embodiment, the frequency analyzing unit 32 obtains frequency spectra for each of the first and second directions in the radiation image G0 in the same manner as the third embodiment.

As described above, the sixth embodiment is equipped with the second judging unit 36 of the second embodiment and the third judging unit 38 of the third embodiment. Therefore, the quality of the grid related to periodic structures different from the intended periodic structure of the grid and the quality of the grid related to periodic structures which are present in a direction different from the direction of the stripes of the grid can both be easily judged.

Figure 21:
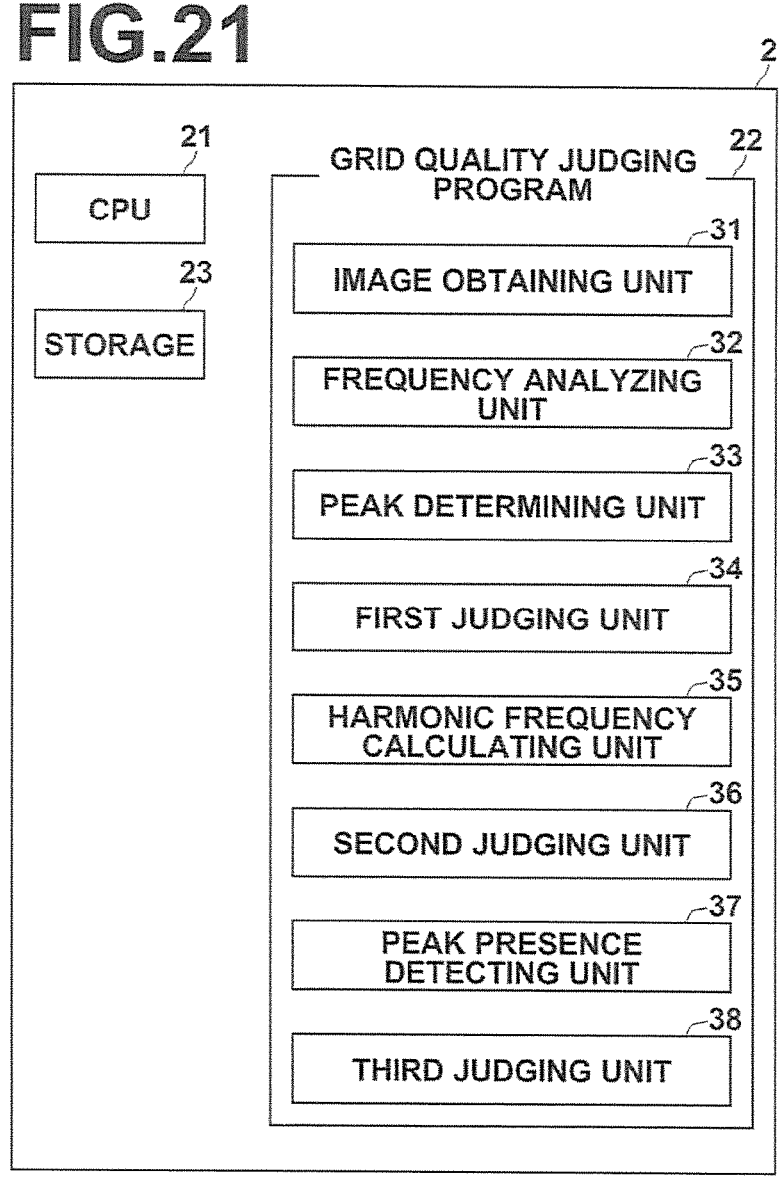
FIG. 21 is a diagram that illustrates the schematic structure of a grid quality judging apparatus according to a seventh embodiment.

Next, a seventh embodiment of the present disclosure will be described. FIG. 21 is a diagram that illustrates the schematic structure of a grid quality judging apparatus according to the seventh embodiment, which is realized by installing a grid quality judging program into a computer 2. Note that in FIG. 21, constituent elements which are the same as those illustrated in FIG. 2 are denoted with the same reference numerals, and detailed descriptions thereof will be omitted. As illustrated in FIG. 21, the grid quality judging apparatus of the seventh embodiment differs from the first embodiment in that it is equipped with the harmonic frequency calculating unit 35 and the second judging unit 36 of the second embodiment, as well as the peak presence detecting unit 37 and the third judging unit 38 of the third embodiment, in addition to the constituent elements of the grid quality judging apparatus of the first embodiment. Note that in the seventh embodiment, the frequency analyzing unit 32 obtains frequency spectra for each of the first and second directions in the radiation image G0 in the same manner as the third embodiment.

As described above, the seventh embodiment is equipped with the first judging unit 24 of the first embodiment, the second judging unit 36 of the second embodiment, and the third judging unit 38 of the third embodiment. Therefore, the quality of the grid related to fluctuations in grid density, the quality of the grid related to periodic structures different from the intended periodic structure of the grid, and the quality of the grid related to periodic structures which are present in a direction different from the direction of the stripes of the grid can all be easily judged.

Figure 22:
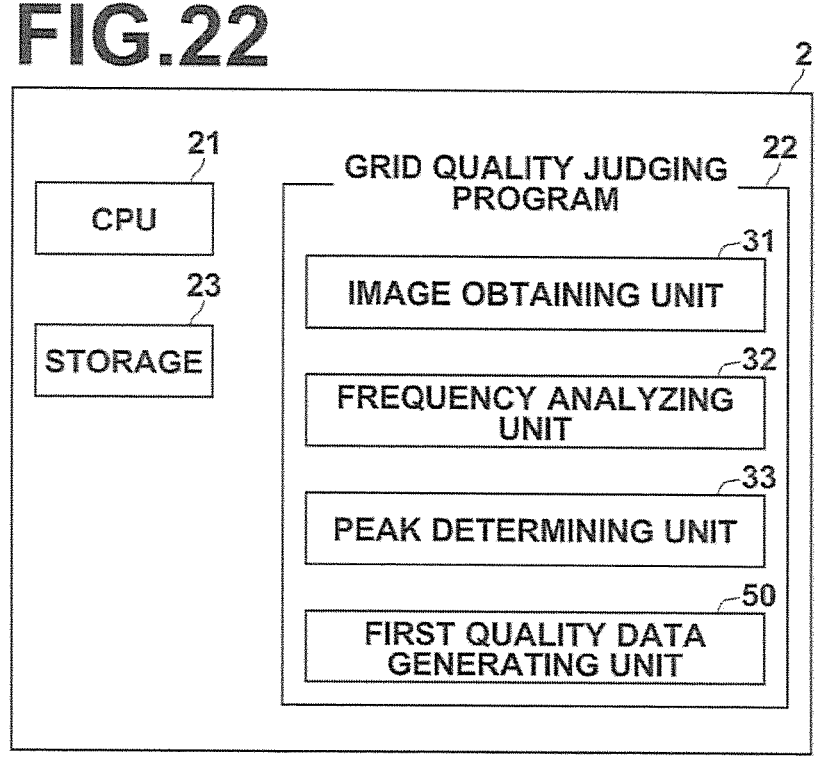
FIG. 22 is a diagram that illustrates the schematic structure of a grid quality judging apparatus according to an eighth embodiment.

Next, an eighth embodiment of the present disclosure will be described. FIG. 22 is a diagram that illustrates the schematic structure of a grid quality judging apparatus according to the eighth embodiment, which is realized by installing a grid quality judging program into a computer 2. Note that in FIG. 22, constituent elements which are the same as those illustrated in FIG. 2 are denoted with the same reference numerals, and detailed descriptions thereof will be omitted. As illustrated in FIG. 22, the grid quality judging apparatus of the eighth embodiment differs from the first embodiment in that it is equipped with a first quality data generating unit 50 that generates quality data representing the quality of the grid, instead of the first judging unit 34 of the grid quality judging apparatus of the first embodiment.

Figure 23:
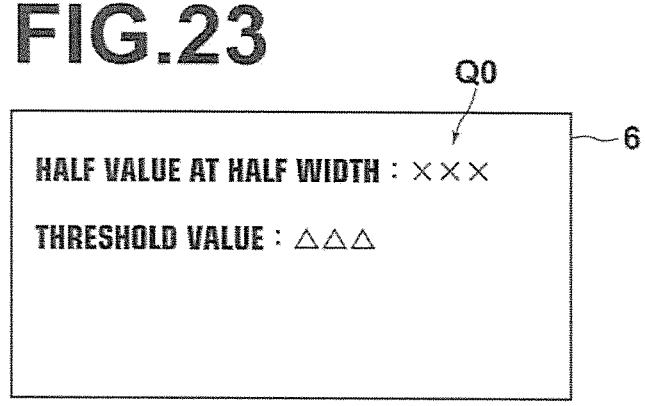
FIG. 23 is a diagram that illustrates quality data which is displayed by a display unit in the eighth embodiment.

The first quality data generating unit 50 measures the half value at half width of a peak which is determined to be a target of processing, generates the measured width of the peak which is determined to be the target of processing as quality data Q0, and outputs the quality data Q0 to the display unit 6. FIG. 23 is a diagram that illustrates the quality data Q0 which is displayed by the display unit 6 in the eighth embodiment. As illustrated in FIG. 23, the value of the half value at half width of the peak which is determined to be target of processing is displayed by the display unit 6 as the quality data Q0. Note that the threshold value Th1 of the first embodiment, against which the width of the peak is compared, may also be displayed by the display unit 6. In FIG. 23, the threshold value Th1 is also displayed along with the width of the peak.

Figure 24:
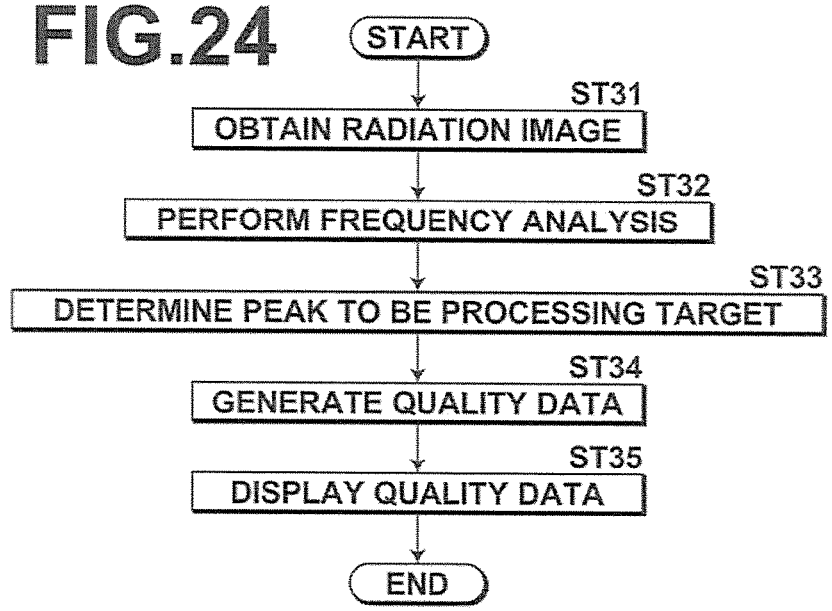
FIG. 24 is a flow chart that illustrates the processes which are performed by the eighth embodiment.

Next, the processes which are performed by the eighth embodiment will be described. FIG. 24 is a flow chart that illustrates the processes which are performed by the eighth embodiment. First, imaging of the grid 4 is performed and the image obtaining nit 31 of the computer 2 obtains a radiation image G0 (step ST31). Then, the frequency analyzing unit 32 performs frequency analysis on the radiation image G0 and obtains the frequency spectrum of the radiation image G0 (step ST32). Next, the peak determining unit 33 determines the peak which will be a target of processing within the frequency spectrum (step ST33). Then, the first quality data generating unit 50 measures the width of the peak which is the target of processing, and generates quality data Q0 representing the measured width of the peak, which is the target of processing (step ST34). Further, the display unit 6 displays the quality data Q0, and the process ends.

As described above, the eighth embodiment measures the width of the peak which is determined to be the target of processing within the frequency spectrum, generates the quality data Q0 representing the measured width of the peak which is the target of processing, and displays the quality data Q0 on the display unit 6. Therefore, an operator can easily judge the quality of the grid related to fluctuations in grid density, based on the displayed quality data Q0.

Figure 25:
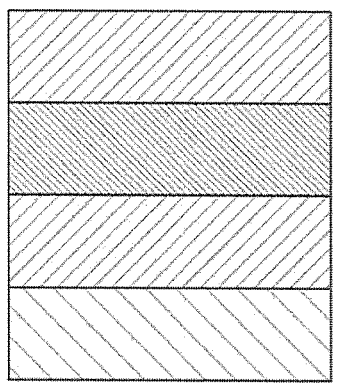
FIG. 25 is a diagram that illustrates an alternate example of quality data which is displayed on the display unit in the eighth embodiment.

Note that in the eighth embodiment, frequency spectra may be calculated for a plurality of regions, the frequency spectrum which is calculated for each of the plurality of regions may be employed to determine the peak which is the target of processing within each of the plurality of regions, and the quality data Q0 may be generated for each of the plurality of regions. In this case, the quality data Q0, that is, the widths of the peaks, may be displayed for each of the plurality of regions. As the manner of display, a color map, in which regions are displayed in different colors according to the widths of the peaks, may be displayed. FIG. 25 is a diagram that illustrates an example of such a color map. Note that in FIG. 25, different hatching indicates different colors. By adopting such a configuration, an operator can judge the quality of the grid related to fluctuations in grid density for each of the plurality of regions.

In addition, in the eighth embodiment described above, the peak determining unit 33 determines the peak which is to be the target of processing. However, in the case that only one peak appears in the frequency response, the frequency at which the peak becomes maximal within the frequency response is known, or the like, the first quality data generating unit 50 may measure the width of the peak within the frequency response without determining the peak which is the target of processing, and cause the measured width to be displayed as the quality data Q0. In addition, the first quality data generating unit 50 may measure the widths of peaks within frequency responses and cause the measured width to be displayed as the quality data Q0 in each of the plurality of regions without determining peaks which are to be targets of processing. In this case, the peak determining unit 33 illustrated in FIG. 22 will become unnecessary.

Figure 26:
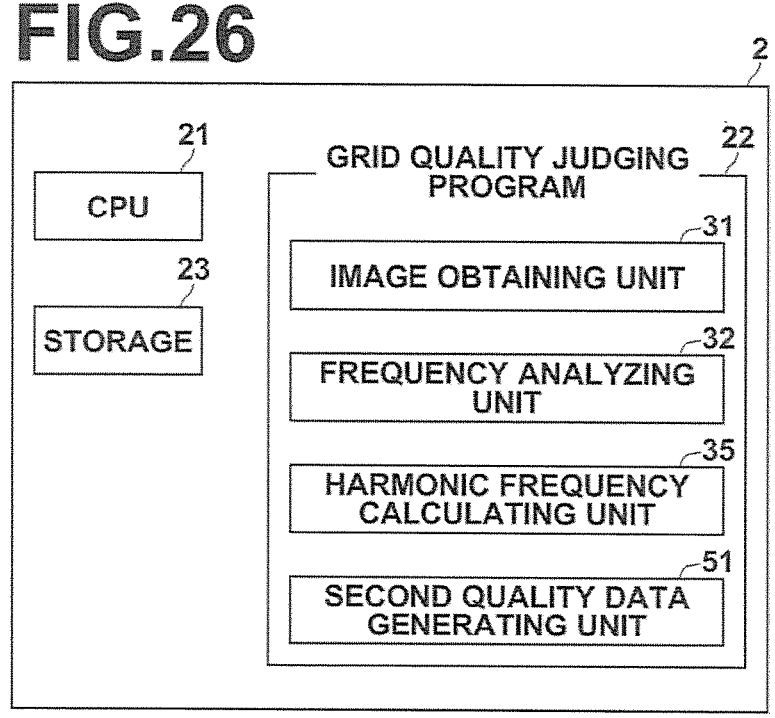
FIG. 26 is a diagram that illustrates the schematic structure of a grid quality judging apparatus according to a ninth embodiment.

Next, a ninth embodiment of the present disclosure will be described. FIG. 26 is a diagram that illustrates the schematic structure of a grid quality judging apparatus according to the ninth embodiment, which is realized by installing a grid quality judging program into a computer 2. Note that in FIG. 26, constituent elements which are the same as those illustrated in FIG. 8 are denoted with the same reference numerals, and detailed descriptions thereof will be omitted. As illustrated in FIG. 26, the grid quality judging apparatus of the ninth embodiment differs from the second embodiment in that it is equipped with a second quality data generating unit 51 that generates quality data representing the quality of the grid, instead of the second judging unit 36 of the grid quality judging apparatus of the second embodiment.

The second quality data generating unit 51 compares the frequency of the peak within the frequency spectrum and the frequency of the at least one harmonic calculated by the harmonic frequency calculating unit 35, generates the presence or absence of a peak at a frequency different from the frequency of the harmonic as quality data Q1, and outputs the generated quality data Q1 to the display unit 6. Specifically, the second quality data generating unit 51 detects the frequencies of all of the peaks within the frequency response. Then, the second quality data generating unit 51 judges whether a frequency, which is a target from among the frequencies of the detected peaks, is within a predetermined threshold value Th2 with respect to the calculated frequencies of all of the harmonics. Further, this judgment is performed for all of the peaks which are detected within the frequency response. As a result, in the case that a peak is present at a frequency which differs from the calculated frequencies of the harmonics by a value greater than the threshold value Th2, the second quality data generating unit 51 generates data indicating that a peak is present at a frequency which differs from the frequencies of the harmonics as the quality data Q1. On the other hand, in the case that no peaks of frequencies that differ from the calculated frequencies of the harmonics by a value greater than the threshold value Th2 appear, the second quality data generating unit 51 generates data indicating that no peaks are present at frequencies that differ from the frequencies of the harmonics as the quality data Q1. The display unit 6 displays the quality data Q1.

Figure 27:
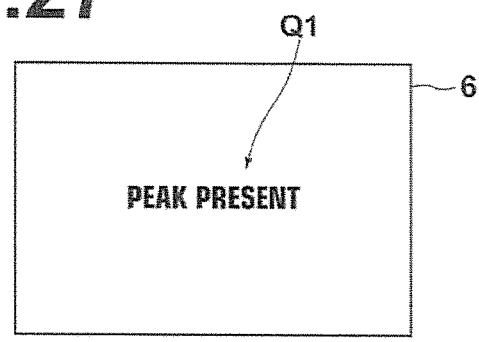
FIG. 27 is a diagram that illustrates quality data which is displayed by a display unit in the ninth embodiment.

FIG. 27 is a diagram that illustrates the quality data Q1 which is displayed by the display unit 6 in the ninth embodiment. As illustrated in FIG. 27, the display unit 6 displays whether a peak is present or absent at a frequency different from the frequencies of the harmonics as the quality data Q1. Note that in FIG. 27, text reading "Peak Present" is displayed.

As described above, the ninth embodiment compares the frequencies of the peaks in the frequency spectrum with the calculated frequencies of the at least one harmonic calculated by the harmonic frequency calculating unit 35, generates data representing the presence or absence of peaks at frequencies different from the frequencies of the harmonics as the quality data Q1, and displays the quality data Q1 on the display unit 6. Therefore, an operator can easily judge the quality of the grid related to periodic structures different from the intended periodic structure of the grid, based on the displayed quality data Q1.

Note that in the ninth embodiment, frequency spectra which are calculated for each of a plurality of regions may be employed to determine peaks which are to be targets of processing and to generate the quality data Q1, for each of the plurality of regions. In this case, the quality data Q1, that is, the presence or absence of the peaks, may be displayed for each of the plurality of regions. As the manner of display, a color map, in which regions are displayed in different colors according to the presence or absence of the peaks, may be displayed. By adopting such a configuration, an operator can judge the quality of the grid related to periodic structures different from the intended periodic structure of the grid for each of the plurality of regions.

Figure 28:
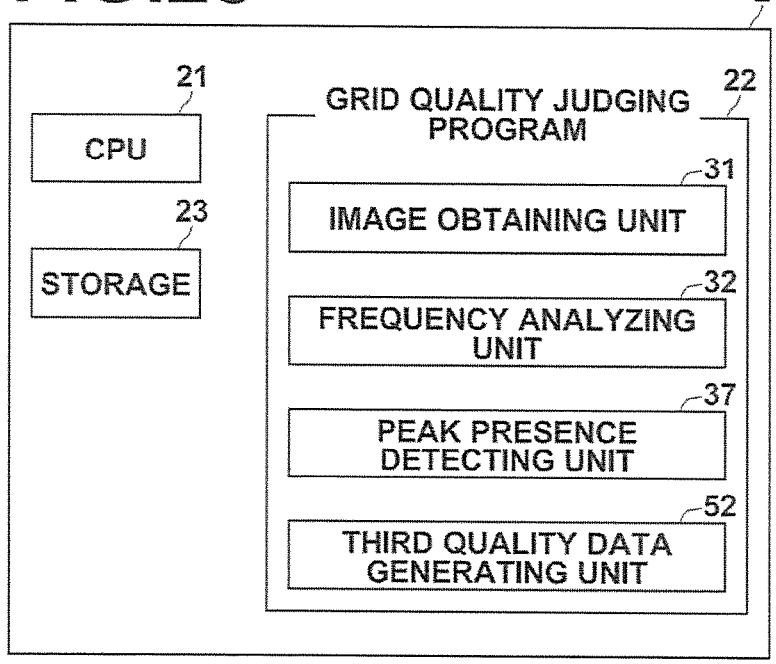
FIG. 28 is a diagram that illustrates the schematic structure of a grid quality judging apparatus according to a tenth embodiment.

Next, a tenth embodiment of the present disclosure will be described. FIG. 28 is a diagram that illustrates the schematic structure of a grid quality judging apparatus according to the tent embodiment, which is realized by installing a grid quality judging program into a computer 2. Note that in FIG. 28, constituent elements which are the same as those illustrated in FIG. 12 are denoted with the same reference numerals, and detailed descriptions thereof will be omitted. As illustrated in FIG. 28, the grid quality judging apparatus of the tenth embodiment differs from the third embodiment in that it is equipped with a third quality data generating unit 52 that generates quality data representing the quality of the grid, instead of the third judging unit 38 of the grid quality judging apparatus of the third embodiment.

The third quality data generating unit 52 generates quality data Q2 representing the presence or absence of peaks within frequency spectra for both a first and second direction, and outputs the quality data Q2 to the display unit 6. The display unit 6 displays the quality data Q2.

Figure 29:
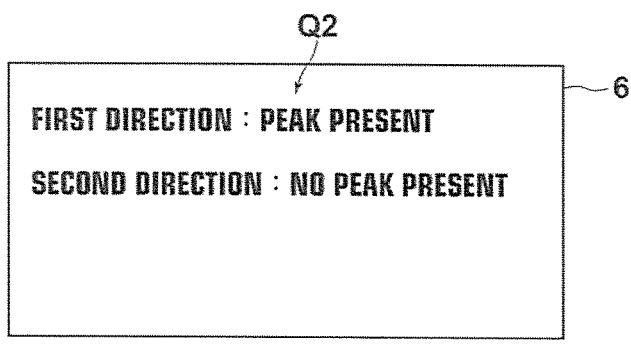
FIG. 29 is a diagram that illustrates quality data which is displayed by a display unit in the tenth embodiment.

FIG. 29 is a diagram that illustrates the quality data Q2 which is displayed by the display unit 6 in the tenth embodiment. As illustrated in FIG. 29, the display unit 6 displays the presence or absence of peaks in the frequency spectrum of each of the first and second directions as the quality data Q2. Note that in FIG. 29, text reading "Peak Present" is displayed with respect to the first direction, and text reading "No Peak Present" is displayed with respect to the second direction.

As described above, the tenth embodiment generates data representing the presence or absence of peaks in the frequency spectrum of each of the first and second directions as the quality data Q2, and causes the quality data Q2 to be displayed by the display unit 6. Therefore, an operator can easily judge the quality of the grid related to periodic structures which are present in a direction different from the direction of the stripes of the grid, based on the displayed quality data Q2.

Note that in the tenth embodiment, the radiation image G0 may be divided into a plurality of regions, for example, four equal parts, and the quality data Q2 representing the quality of the grid may be generated for each of the plurality of regions based on the presence or absence of peaks in the frequency spectra of the first and second directions within each of the regions. In this case, the quality data Q2, that is, the presence or absence of peaks in the first and second directions, may be displayed for each of the regions. As the manner of display, a color map in which the colors of regions differ according to the presence or absence of peaks in the first and second directions may be displayed. For example, a region may be colored green in the case that a peak is present only in the first direction, and colored red in the case that peaks are present in both the first and second directions. Thereby, an operator can judge the quality of the grid related to periodic structures which are present in a direction different from the direction of the stripes of the grid within each of a plurality of regions.

Figure 30:
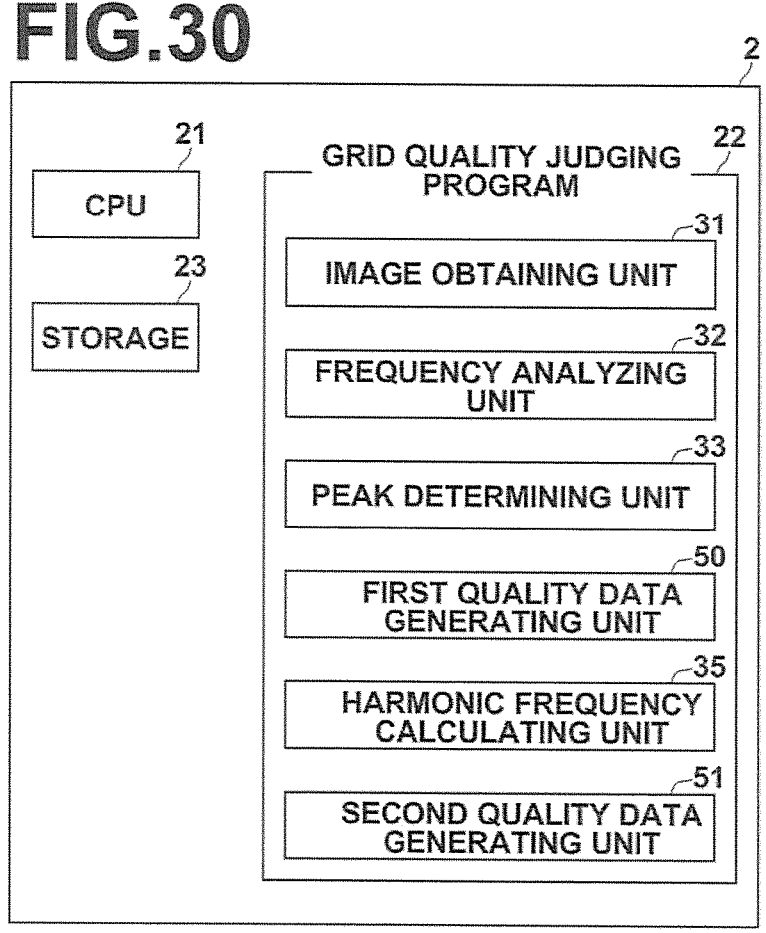
FIG. 30 is a diagram that illustrates the schematic structure of a grid quality judging apparatus according to an eleventh embodiment.

Next, an eleventh embodiment of the present disclosure will be described. FIG. 30 is a diagram that illustrates the schematic structure of a grid quality judging apparatus according to the eleventh embodiment, which is realized by installing a grid quality judging program into a computer 2. Note that in FIG. 30, constituent elements which are the same as those illustrated in FIG. 22 are denoted with the same reference numerals, and detailed descriptions thereof will be omitted. As illustrated in FIG. 30, the grid quality judging apparatus of the eleventh embodiment differs from the eighth embodiment in that it is equipped with the harmonic frequency calculating unit 35 and the second quality data generating unit 51 of the ninth embodiment, in addition to the constituent elements of the grid quality judging apparatus of the eighth embodiment, and in that the display unit 6 is configured to display quality data Q0 and Q1.

As described above, the eleventh embodiment is equipped with the first quality data generating unit 50 of the eighth embodiment and the second quality data generating unit 51 of the ninth embodiment. Therefore, an operator can easily judge both the quality of the grid related to fluctuations in grid density and the quality of the grid related to periodic structures different from the intended periodic structure of the grid, by referring to the quality data Q0 and Q1 which are displayed by the display unit 6.

Figure 31:
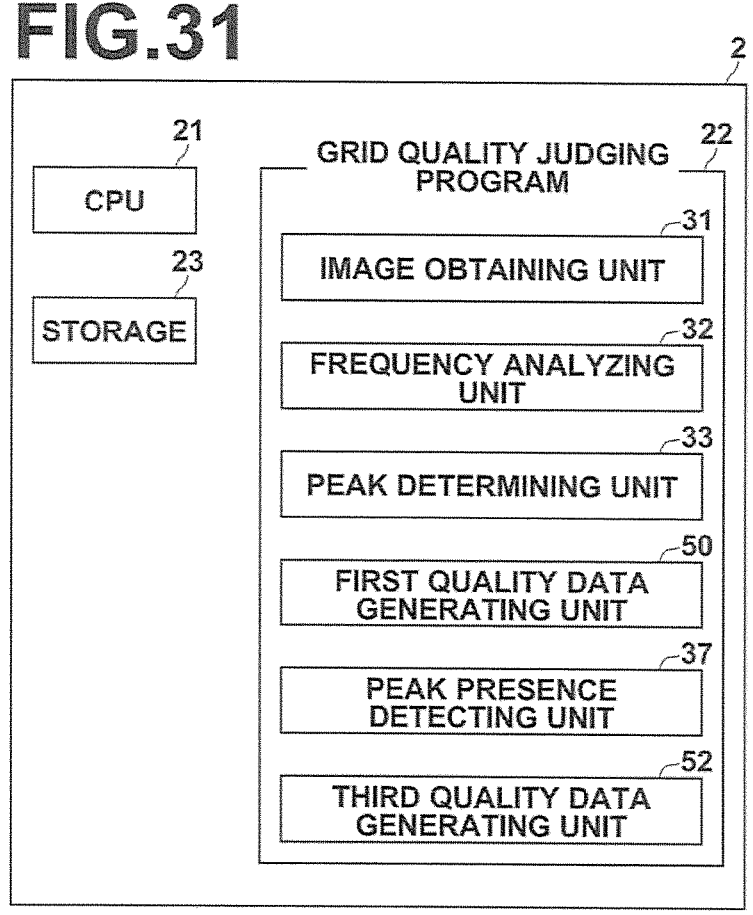
FIG. 31 is a diagram that illustrates the schematic structure of a grid quality judging apparatus according to a twelfth embodiment.

Next, a twelfth embodiment of the present disclosure will be described. FIG. 31 is a diagram that illustrates the schematic structure of a grid quality judging apparatus according to the twelfth embodiment, which is realized by installing a grid quality judging program into a computer 2. Note that in FIG. 31, constituent elements which are the same as those illustrated in FIG. 22 are denoted with the same reference numerals, and detailed descriptions thereof will be omitted. As illustrated in FIG. 31, the grid quality judging apparatus of the twelfth embodiment differs from the eighth embodiment in that it is equipped with the peak presence detecting unit 37 and the third quality data generating unit 52 of the tenth embodiment, in addition to the constituent elements of the grid quality judging apparatus of the eighth embodiment, and in that the display unit 6 is configured to display quality data Q0 and Q2. Note that in the twelfth embodiment, the frequency analyzing unit 32 obtains frequency spectra for each of the first and second directions in the radiation image G0 in the same manner as the tenth embodiment.

As described above, the twelfth embodiment is equipped with the first quality data generating unit 50 of the eighth embodiment and the third quality data generating unit 52 of the eighth embodiment. Therefore, and operator can easily judge both the quality of the grid related to fluctuations in grid density and the quality of the grid related to periodic structures which are present in a direction different from the direction of the stripes of the grid, by referring to the quality data Q0 and Q2 which are displayed by the display unit 6.

Figure 32:
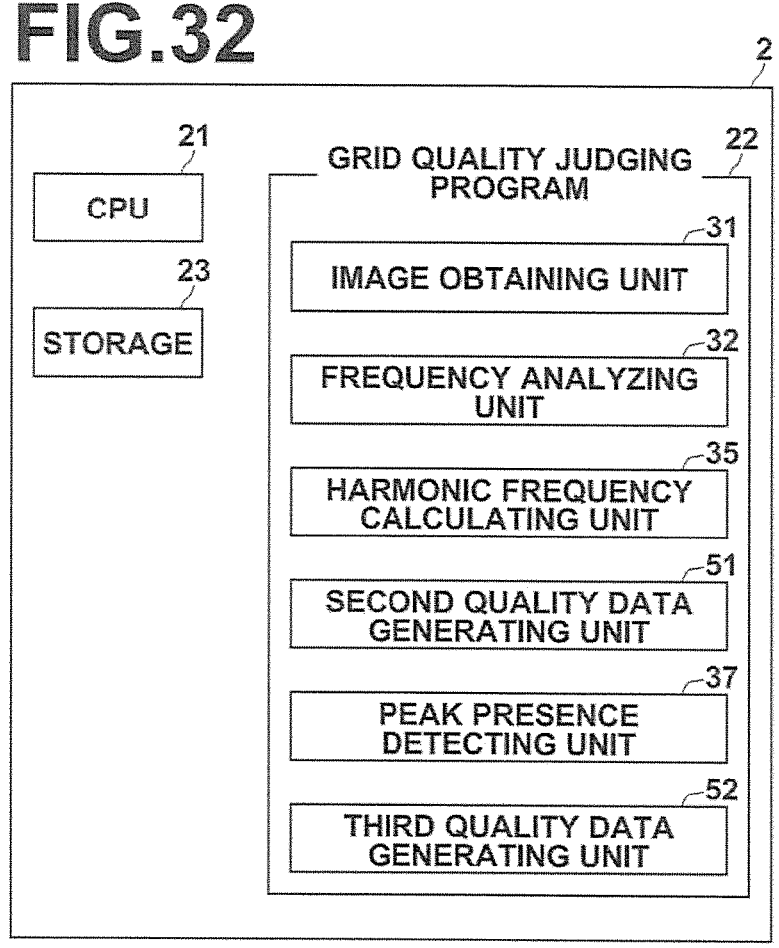
FIG. 32 is a diagram that illustrates the schematic structure of a grid quality judging apparatus according to a thirteenth embodiment.

Next, a thirteenth embodiment of the present disclosure will be described. FIG. 32 is a diagram that illustrates the schematic structure of a grid quality judging apparatus according to the thirteenth embodiment, which is realized by installing a grid quality judging program into a computer 2. Note that in FIG. 32, constituent elements which are the same as those illustrated in FIG. 26 are denoted with the same reference numerals, and detailed descriptions thereof will be omitted. As illustrated in FIG. 32, the grid quality judging apparatus of the thirteenth embodiment differs from the tenth embodiment in that it is equipped with the peak presence detecting unit 37 and the third quality data generating unit 52 of the tenth embodiment, in addition to the constituent elements of the grid quality judging apparatus of the ninth embodiment, and in that the display unit 6 is configured to display quality data Q1 and Q2. Note that in the thirteenth embodiment, the frequency analyzing unit 32 obtains frequency spectra for each of the first and second directions in the radiation image G0 in the same manner as the tenth embodiment.

As described above, the thirteenth embodiment is equipped with the second quality data generating unit 51 of the ninth embodiment and the third quality data generating unit 52 of the tenth embodiment. Therefore, an operator can easily judge both the quality of the grid related to periodic structures different from the intended periodic structure of the grid and the quality of the grid related to periodic structures which are present in a direction different from the direction of the stripes of the grid, by referring to the quality data Q1 and Q2 which are displayed by the display unit 6.

Next, a fourteenth embodiment of the present disclosure will be described. FIG. 33 is a diagram that illustrates the schematic structure of a grid quality judging apparatus according to the seventh embodiment, which is realized by installing a grid quality judging program into a computer 2. Note that in FIG. 33, constituent elements which are the same as those illustrated in FIG. 22 are denoted with the same reference numerals, and detailed descriptions thereof will be omitted. As illustrated in FIG. 33, the grid quality judging apparatus of the fourteenth embodiment differs from the eighth embodiment in that it is equipped with the harmonic frequency calculating unit 35 and the second quality data generating unit 51 of the ninth embodiment, as well as the peak presence detecting unit 37 and the third quality data generating unit 52 of the tenth embodiment, in addition to the constituent elements of the grid quality judging apparatus of the eighth embodiment, and in that the display unit 6 is configured to display quality data Q0, Q1, and Q2. Note that in the fourteenth embodiment, the frequency analyzing unit 32 obtains frequency spectra for each of the first and second directions in the radiation image G0 in the same manner as the tenth embodiment.

As described above, the fourteenth embodiment is equipped with the first quality data generating unit 50 of the eighth embodiment, the second quality data generating unit 51 of the ninth embodiment, and the third quality data generating unit 52 of the tenth embodiment. Therefore, an operator can easily judge all of the quality of the grid related to fluctuations in grid density, the quality of the grid related to periodic structures different from the intended periodic structure of the grid, and the quality of the grid related to periodic structures which are present in a direction different from the direction of the stripes of the grid, by referring to the quality data Q0, Q1, and Q2 which are displayed by the display unit 6.

Note that in each of the embodiments described above, radiation images which are obtained by systems that employ the radiation detector 5 to obtain radiation images of subjects are employed to perform scattered ray removing processes. However, it goes without saying that the present disclosure can be applied to cases in which radiation images, which are obtained by recording radiation image data in a stimulable phosphor sheet as a radiation detector as disclosed in Japanese Unexamined Patent Publication No. H8-266529, H9-22039, etc. and then photoelectrically read out from the stimulable phosphor sheet, are employed as well.

Hereinafter, the operative effects of the embodiments of the present disclosure will be described.

If there are no fluctuations in the grid density, a peak will only appear in a frequency response at a frequency that corresponds to the intended periodic structure of the grid, and therefore the width of the peak which is the target of processing will be small. On the other hand, in the case that there are fluctuations in the grid density, peaks will appear at frequencies different from the frequency of the intended periodic structure of the grid, in addition to the peak at the frequency of the intended periodic structure of the grid. In addition, these two frequencies will not differ greatly, and the values thereof will be comparatively close. As a result, the peaks of the two frequencies will overlap, and the width of the peak which is the target of processing within the frequency response will become great. Accordingly, the width of the peak which is the target of processing corresponds to the size of fluctuations in the grid density. That is, the fluctuations in grid density will be smaller as the width of the peak is smaller. For this reason, the quality of the grid related to fluctuations in the grid density can be easily judged by measuring the width of the peak and judging the quality of the grid based on the measured width of the peak or by generating quality data that represents the width of the peak and displaying the quality data. For example, the width of the peak may be compared with a threshold value, and the quality of the grid may be judged to be poor if the width of the peak is greater than or equal to the threshold value.

The quality of the grid related to fluctuations in the grid density can be judged for each region of the grid, by dividing the radiation image into a plurality of regions, obtaining frequency spectra, determining peaks which are to be targets of processing, and judging the quality of the grid or generating and displaying quality data for each of the divided regions.

In the case that a periodic structure different from the intended periodic structure of the grid is not present, the frequency of the peak included in the frequency spectrum will match the calculated frequency of the harmonic. On the other hand, in the case that that a periodic structure different from the intended periodic structure of the grid is present, a peak will appear in the frequency spectrum at a frequency other than the calculated frequency of the harmonic. Therefore, by comparing the frequencies of the peaks in the frequency spectrum with the frequencies of harmonics, and judging the quality of the grid based on the presence or absence of peaks at frequencies different from the frequencies of the harmonics or generating quality data representing the presence or absence of such peaks, the quality of the grid related to periodic structures different from the intended periodic structure of the grid can be easily judged. For example, the quality of a grid can be judged to be poor in the case that a peak is present at a frequency other than the frequencies of harmonics as a result of the comparison.

Here, if periodic structures in a direction different from that of the stripes of the grid are not included in the grid, peaks will be included in only one of the frequency spectra which are obtained for each of the first and second directions, which are perpendicular to each other within the radiation image. On the other hand, in the case that a periodic structure in a direction different from the stripes of the grid is included in the grid, peaks will appear in the frequency spectra obtained for both the first and second directions. At this time, the sizes of the peaks differ in the direction of the stripes of the grid and the direction different therefrom. Therefore, it is possible to recognize which of the first and second directions the directions of the stripes is. Accordingly, the quality of the grid can be easily judged, by judging the quality of the grid based on the presence of peaks in the frequency spectra in the first and second directions or by generating quality data representing the presence or absence of peaks. For example, the quality of the grid may be judged to poor in the case that a peak appears in the frequency spectrum in a direction different from the direction of the stripes of the grid.

What is claimed is:

1. A grid quality judging apparatus comprising:
a processor, configured to:
perform frequency analysis on a radiation image that is generated by an imaging apparatus and includes a periodic pattern caused by a grid, to obtain a frequency spectrum of the radiation image, wherein the imaging apparatus comprises an X-ray source and a radiation detector;
judge the quality of the grid represented by quality data, based on peaks which are included in the frequency spectrum, wherein the peaks comprise a target peak, wherein the target peak corresponds to the peak which is a target of processing, and wherein:
the processor judges whether a width of the target peak is greater than or equal to a threshold value;
the processor judges the quality of the grid to be poor in response to the width of the target peak being greater than or equal to the threshold value; and
the processor judges the quality of the grid to be good in response to the width of the target peak being less than the threshold value; and
displaying the quality data.

2. A grid quality judging apparatus as defined in claim 1, wherein:
the processor divides the radiation image into a plurality of regions and obtain frequency spectra for each of the plurality of regions; and
the processor measures the widths of peaks within each of the plurality of regions, and judges the quality of the grid in each of the plurality of grids based on the measured widths of the peaks within each of the plurality of regions.

3. A grid quality judging apparatus as defined in claim 1, wherein:
the processor divides the radiation image into a plurality of regions and obtain frequency spectra for each of the plurality of regions;
the processor determines peaks to be targets of processing within each of the plurality of regions; and
the processor measures the widths of peaks which are targets of processing within each of the plurality of regions, and judges the quality of the grid in each of the plurality of regions based on the measured widths of the peaks which are targets of processing within each of the plurality of regions.

4. A grid quality judging apparatus as defined in claim 1, wherein:
the processor is further configured to calculate the frequency of at least one harmonic which is generated based on the grid density and the Nyquist frequency of the radiation image; and wherein:
the processor compares the frequency of the peaks within the frequency spectrum and the frequency of the at least one harmonic, and judges the quality of the grid based on the presence or the absence of a peak at a frequency different from the frequency of the harmonic.

5. A grid quality judging apparatus as defined in claim 4, wherein:
the processor divides the radiation image into a plurality of regions and obtain frequency spectra for each of the plurality of regions;
the processor calculates the frequency of at least one harmonic within each of the plurality of regions; and
the processor compares the frequency of the peaks within the frequency spectrum and the frequency of the at least one harmonic, and judges the quality of the grid based on the presence or the absence of a peak at a frequency different from the frequency of the harmonic within each of the plurality of regions.

6. A first grid quality judging apparatus as defined in claim 1, wherein:
the processor obtains frequency spectra for each of a first and second direction which are perpendicular to each other, by performing frequency analysis in the first and second directions within the radiation image;
the processor is further configured to detect the presence or absence of peaks within the frequency spectra for the first and second directions; and
the processor judges the quality of the grid based on the presence or absence of peaks within the frequency spectra for the first and second directions.

7. A grid quality judging apparatus as defined in claim 6, wherein
the processor divides the radiation image into a plurality of regions and obtains frequency spectra for the first and second directions within each of the plurality of regions;
the processor detects the presence or absence of peaks within the frequency spectra of each of the plurality of regions; and
the processor judges the quality of the grid based on the presence or absence of peaks within the frequency spectra for the first and second directions within each of the plurality of regions.

8. A grid quality judging apparatus comprising:
a processor, configured to:
perform frequency analysis on a radiation image that is generated by an imaging apparatus and includes a periodic pattern caused by a grid, to obtain a frequency spectrum of the radiation image, wherein the imaging apparatus comprises an X-ray source and a radiation detector;
generate quality data that represents the quality of the grid, based on peaks which are included in the frequency spectrum, wherein the peaks comprise a target peak,
wherein the target peak corresponds to the peak which is a target of processing, and wherein:
the processor judges whether a width of the target peak is greater than or equal to a threshold value;
the processor judges the quality of the grid to be poor in response to the width of the target peak being greater than or equal to the threshold value; and
the processor judges the quality of the grid to be good in response to the width of the target peak being less than the threshold value; and
a display configured to display the quality data.

9. A grid quality judging apparatus as defined in claim 8, wherein:
the processor divides the radiation image into a plurality of regions and obtains frequency spectra for each of the plurality of regions; and
the processor measures the widths of peaks within each of the plurality of regions, and generates the quality data for each of the plurality of grids based on the measured widths of the peaks within each of the plurality of regions.

10. A grid quality judging apparatus as defined in claim 8, wherein:
the processor divides the radiation image into a plurality of regions and obtain frequency spectra for each of the plurality of regions;
the processor determines peaks to be targets of processing within each of the plurality of regions; and
the processor measures the widths of peaks which are targets of processing within each of the plurality of regions, and generates the quality data for each of the plurality of regions based on the measured widths of the peaks which are targets of processing within each of the plurality of regions.

11. A grid quality judging apparatus as defined in claim 8, wherein:
the processor is further configured to calculate the frequency of at least one harmonic which is generated based on the grid density and the Nyquist frequency of the radiation image; and wherein:
the processor compares the frequency of the peaks within the frequency spectrum and the frequency of the at least one harmonic, and generates the quality data based on the presence or the absence of a peak at a frequency different from the frequency of the harmonic.

12. A grid quality judging apparatus as defined in claim 11, wherein:
the processor divides the radiation image into a plurality of regions and obtains frequency spectra for each of the plurality of regions;
the processor calculates the frequency of at least one harmonic within each of the plurality of regions; and
the processor compares the frequency of the peaks within the frequency spectrum and the frequency of the at least one harmonic and generates the quality data based on the presence or the absence of a peak at a frequency different from the frequency of the harmonic within each of the plurality of regions.

13. A grid quality judging apparatus as disclosed in claim 8, wherein:
the processor obtains frequency spectra for each of a first and second direction which are perpendicular to each other, by performing frequency analysis in the first and second directions within the radiation image;
the processor is further configured to detect the presence or absence of peaks within the frequency spectra for the first and second directions; and
the processor generates the quality data based on the presence or absence of peaks within the frequency spectra for the first and second directions.

14. A grid quality judging apparatus as defined in claim 13, wherein:
the processor divides the radiation image into a plurality of regions and obtains frequency spectra for the first and second directions within each of the plurality of regions;
the processor detects the presence or absence of peaks within the frequency spectra of each of the plurality of regions; and
the processor generates the quality data based on the presence or absence of peaks within the frequency spectra for the first and second directions within each of the plurality of regions.

15. A grid quality judging method comprising:
performing frequency analysis on a radiation image that is generated by an imaging apparatus and includes a periodic pattern caused by a grid, to obtain a frequency spectrum of the radiation image, wherein the imaging apparatus comprises an X-ray source and a radiation detector;
judging the quality of the grid represented by quality data, based on peaks which are included in the frequency spectrum, wherein the peaks comprise a target peak, wherein the target peak corresponds to the peak which is a target of processing, and wherein judging the quality of the grid comprises:
judging whether a width of the target peak is greater than or equal to a threshold value;
judging the quality of the grid to be poor in response to the width of the target peak being greater than or equal to the threshold value; and
judging the quality of the grid to be good in response to the width of the target peak being less than the threshold value; and
displaying the quality data.

16. A grid quality judging method comprising:
performing frequency analysis on a radiation image that is generated by an imaging apparatus and includes a periodic pattern caused by a grid, to obtain a frequency spectrum of the radiation image, wherein the imaging apparatus comprises an X-ray source and a radiation detector;
generating quality data that represents the quality of the grid, based on peaks which are included in the frequency spectrum, wherein the peaks comprise a target peak, wherein the target peak corresponds to the peak which is a target of processing, and wherein generating the quality that represents the quality of the grid comprises:
judging whether a width of the target peak is greater than or equal to a threshold value;
judging the quality of the grid to be poor in response to the width of the target peak being greater than or equal to the threshold value; and
judging the quality of the grid to be good in response to the width of the target peak being less than the threshold value; and
displaying the quality data.

17. A non-transitory recording medium having a grid quality judging program recorded therein, the grid quality judging program causing a computer to execute the procedures of:
performing frequency analysis on a radiation image that is generated by an imaging apparatus and includes a periodic pattern caused by a grid, to obtain a frequency spectrum of the radiation image, wherein the imaging apparatus comprises an X-ray source and a radiation detector;
judging the quality of the grid represented by quality data, based on peaks which are included in the frequency spectrum, wherein the peaks comprise a target peak, wherein the target peak corresponds to the peak which is a target of processing, and wherein judging the quality of the grid comprises:
judging whether a width of the target peak is greater than or equal to a threshold value;
judging the quality of the grid to be poor in response to the width of the target peak being greater than or equal to the threshold value; and
judging the quality of the grid to be good in response to the width of the target peak being less than the threshold value; and
displaying the quality data.

18. A non-transitory recording medium having a grid quality judging program recorded therein, the grid quality judging program causing a computer to execute the procedures of:
performing frequency analysis on a radiation image that is generated by an imaging apparatus and includes a periodic pattern caused by a grid, to obtain a frequency spectrum of the radiation image, wherein the imaging apparatus comprises an X-ray source and a radiation detector;
generating quality data that represents the quality of the grid, based on peaks which are included in the frequency spectrum, wherein the peaks comprise a target peak, wherein the target peak corresponds to the peak which is a target of processing, and wherein generating the quality that represents the quality of the grid comprises:
judging whether a width of the target peak is greater than or equal to a threshold value;
judging the quality of the grid to be poor in response to the width of the target peak being greater than or equal to the threshold value; and
judging the quality of the grid to be good in response to the width of the target peak being less than the threshold value; and
displaying the quality data.

* * * * *